(12) United States Patent
Noyes

(10) Patent No.: US 9,501,131 B2
(45) Date of Patent: Nov. 22, 2016

(54) METHODS AND SYSTEMS FOR POWER MANAGEMENT IN A PATTERN RECOGNITION PROCESSING SYSTEM

(75) Inventor: Harold B Noyes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 650 days.

(21) Appl. No.: 13/601,621

(22) Filed: Aug. 31, 2012

(65) Prior Publication Data

US 2014/0067736 A1   Mar. 6, 2014

(51) Int. Cl.
| | |
|---|---|
| G06F 15/82 | (2006.01) |
| G06F 1/26 | (2006.01) |
| G06F 11/30 | (2006.01) |
| G06F 1/32 | (2006.01) |
| G06K 9/00 | (2006.01) |

(52) U.S. Cl.
CPC ............ G06F 1/3287 (2013.01); G06F 1/3206 (2013.01); G06K 9/00973 (2013.01); Y02B 60/1282 (2013.01)

(58) Field of Classification Search
USPC ...... 706/20; 712/28; 713/320, 324, 330, 340
See application file for complete search history.

(56) References Cited

U.S. PATENT DOCUMENTS

| | | | |
|---|---|---|---|
| 6,625,740 B1 | 9/2003 | Datar et al. | |
| 7,392,229 B2 | 6/2008 | Harris et al. | |
| 7,487,131 B2 | 2/2009 | Harris et al. | |
| 7,487,542 B2 | 2/2009 | Boulanger | |
| 7,774,286 B1 | 8/2010 | Harris | |
| 7,917,684 B2 | 3/2011 | Noyes et al. | |
| 7,970,964 B2 | 6/2011 | Noyes | |
| 8,065,249 B1 | 11/2011 | Harris | |
| 8,140,780 B2 | 3/2012 | Noyes | |
| 2003/0115428 A1* | 6/2003 | Zaccarin et al. | ............... 711/156 |
| 2008/0178031 A1 | 7/2008 | Kim | |
| 2010/0100691 A1 | 4/2010 | Noyes et al. | |

(Continued)

FOREIGN PATENT DOCUMENTS

| | | |
|---|---|---|
| JP | 2006146875 A | 6/2006 |
| JP | 2009037335 A | 2/2009 |
| JP | 2009093383 A | 4/2009 |
| WO | 2011049895 A1 | 4/2011 |

OTHER PUBLICATIONS

Marculescu et al., (Marculescu), Power Management of Multi-Core Systems: Challenges, Approaches, and Recent Developments Tutorial at ASPLOS, London, UK [online], Mar. 4, 2012 [retrieved on Jul. 12, 2014], Retrieved from the Internet<URL: https://www.google.com/url?sa=t&rct=j&q=&esrc=s&frm=1&source=web&cd=8&ved=0CFcQFjAH&url=https%3A%2F%2Fwww.e.*

(Continued)

Primary Examiner — Stanley K Hill
Assistant Examiner — Nathan Brown, Jr.
(74) Attorney, Agent, or Firm — Fletcher Yoder, P.C.

(57) ABSTRACT

A device includes a state machine. The state machine includes a plurality of blocks, where each of the blocks includes a plurality of rows. Each of these rows includes a plurality of programmable elements. Furthermore, each of the programmable elements are configured to analyze at least a portion of a data stream and to selectively output a result of the analysis. Each of the plurality of blocks also has corresponding block activation logic configured to dynamically power-up the block.

19 Claims, 12 Drawing Sheets

(56) References Cited

U.S. PATENT DOCUMENTS

| | | | |
|---|---|---|---|
| 2010/0100714 A1 | 4/2010 | Noyes et al. |
| 2010/0115347 A1 | 5/2010 | Noyes |
| 2010/0118425 A1 | 5/2010 | Rafaelof |
| 2010/0138432 A1 | 6/2010 | Noyes |
| 2010/0138575 A1 | 6/2010 | Noyes |
| 2010/0138634 A1 | 6/2010 | Noyes |
| 2010/0138635 A1 | 6/2010 | Noyes |
| 2010/0174887 A1 | 7/2010 | Pawlowski |
| 2010/0174929 A1 | 7/2010 | Pawlowski |
| 2010/0175130 A1 | 7/2010 | Pawlowski |
| 2010/0185647 A1 | 7/2010 | Noyes |
| 2010/0332809 A1 | 12/2010 | Noyes et al. |
| 2011/0145182 A1 | 6/2011 | Dlugosch et al. |
| 2011/0145251 A1 | 6/2011 | Lee et al. |
| 2011/0145271 A1 | 6/2011 | Noyes et al. |
| 2011/0145544 A1 | 6/2011 | Noyes et al. |
| 2011/0258360 A1 | 10/2011 | Noyes |
| 2011/0307433 A1 | 12/2011 | Dlugosch |
| 2011/0307503 A1 | 12/2011 | Dlugosch |
| 2012/0192163 A1 | 7/2012 | Glendenning |
| 2012/0192164 A1 | 7/2012 | Xu |
| 2012/0192165 A1 | 7/2012 | Xu |
| 2012/0192166 A1 | 7/2012 | Xu |

OTHER PUBLICATIONS

Gibson10, Forwardflow: A Scalable Core for Power-Constrained CMPs, ISCA Saint-Malo, France [online], 2010 [retrieved on May 1, 2015]. Retrieved from the Internet<URL:http://www.google.com/url?sa=t&rct=j&q=&esrc=s&source=web&cd=4&cad=rja&uact=8&ved=0CDAQFjAD&url=http%3A%2F%2Fresearch.cs.wisc.edu%2Fmultifacet%2Fpaper%2Fosca2010_forwardflow.pdf>.*

Parhami, Configurable Arithmetic Arrays with Data-Driven Control [online], 2000 [retrieved on Nov. 10, 2015]. Retrieved from the Internet<URL:https://www.google.com/url?sa=t&rct=j&q=&esrc=s&source=web&cd=1&ved=OCCUQFjAAahUKEwign-DQ0oTJAhXHTCYKHRoKB78&url=https%3A%2F%2Fwww.ece.edu%2F~parhami%2Fpubs_folder%2Fparh00-asilo-config-arith.pdf>.*

U.S. Appl. No. 13/601,642, filed Aug. 31, 2012, Brown et al.
U.S. Appl. No. 13/601,491, filed Aug. 31, 2012, Brown.
U.S. Appl. No. 13/327,510, filed Dec. 15, 2011, Noyes.
U.S. Appl. No. 13/327,580, filed Dec. 15, 2011, Brown.
U.S. Appl. No. 13/327,591, filed Dec. 15, 2011, Brown.
U.S. Appl. No. 13/327,623, filed Dec. 15, 2011, Brown.
U.S. Appl. No. 13/327,499, filed Dec. 15, 2011, Noyes.
U.S. Appl. No. 13/425,137, filed Mar. 20, 2012, Noyes.
U.S. Appl. No. 13/552,488, filed Jul. 18, 2012, Brown.
U.S. Appl. No. 13/552,479, filed Jul. 18, 2012, Brown.
U.S. Appl. No. 13/552,492, filed Jul. 18, 2012, Noyes et al.
PCT International Search Report and Written Opinion mailed Nov. 29, 2013.
Japanese Office Action for JP Application No. 2015-529851 Mailed Sep. 13, 2016; 8 Pages.

\* cited by examiner

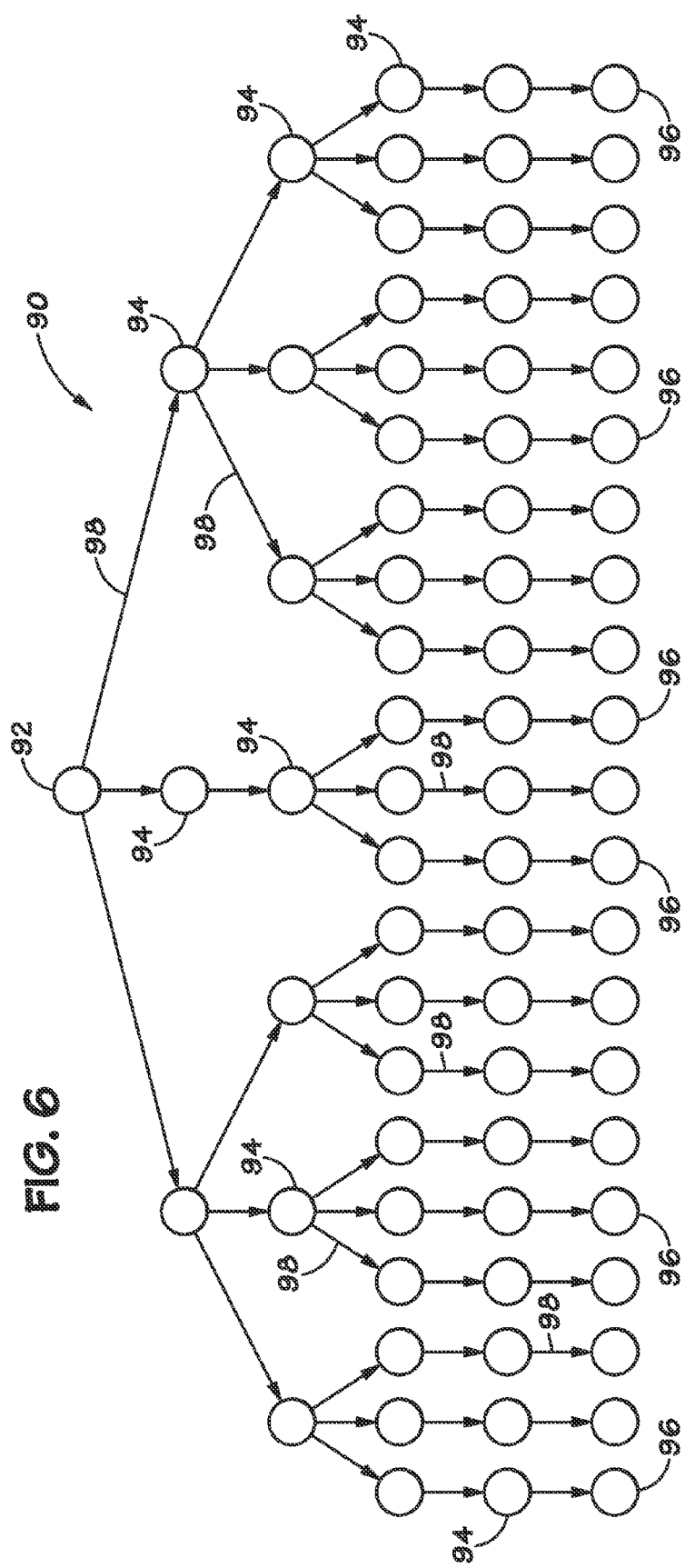

METHODS AND SYSTEMS FOR POWER MANAGEMENT IN A PATTERN RECOGNITION PROCESSING SYSTEM

BACKGROUND

1. Field of Invention

Embodiments of the invention relate generally to electronic devices and, more specifically, in certain embodiments, to electronic devices with parallel devices for data analysis.

2. Description of Related Art

Complex pattern recognition can be inefficient to perform on a conventional von Neumann based computer. A biological brain, in particular a human brain, however, is adept at performing pattern recognition. Current research suggests that a human brain performs pattern recognition using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex pattern recognition that enables humans to perform high level functions such as spatial reasoning, conscious thought, and complex language.

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often is unable to process adequate amounts of data in an amount of time given. Some devices configured to search a data stream do so by distributing the data stream among a plurality of circuits. The circuits each determine whether the data stream matches a portion of a pattern. Often, a large number of circuits operate in parallel, each searching the data stream at generally the same time. However, there has not been a system that effectively allows for performing pattern recognition in a manner more comparable to that of a biological brain. Development of such a system is desirable.

BRIEF DESCRIPTION OF DRAWINGS

FIG. 6 illustrates an example of a finite state machine graph, according to various embodiments of the invention.

DETAILED DESCRIPTION

Figure 1:
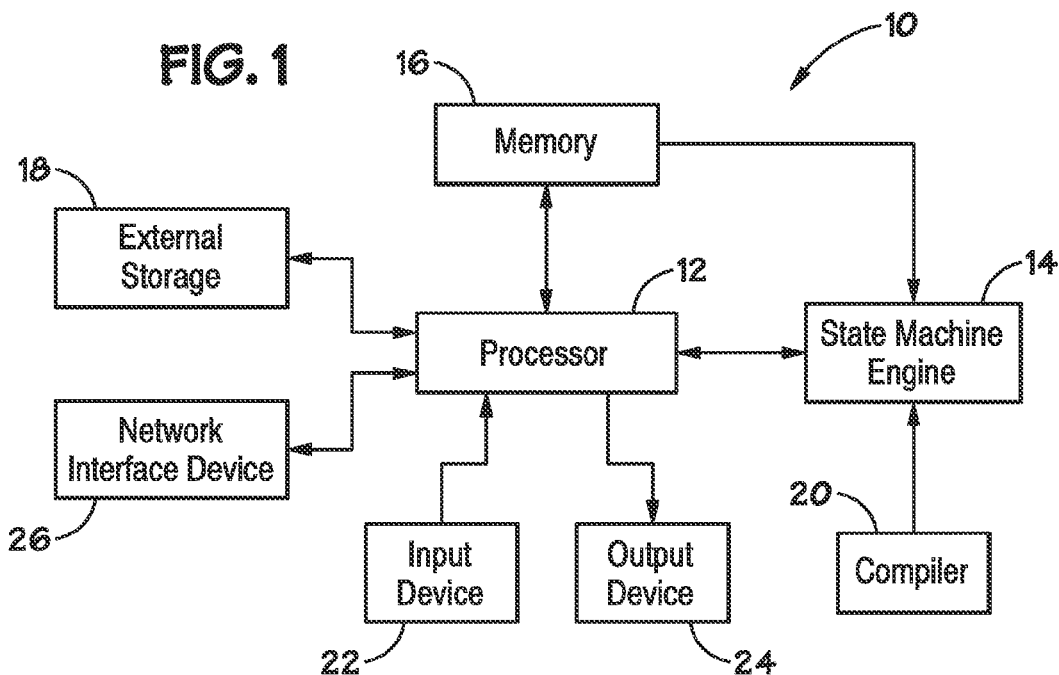
FIG. 1 illustrates an example of system having a state machine engine, according to various embodiments of the invention.

Turning now to the figures, FIG. 1 illustrates an embodiment of a processor-based system, generally designated by reference numeral 10. The system 10 (e.g., data analysis system) may be any of a variety of types such as a desktop computer, laptop computer, pager, cellular phone, personal organizer, portable audio player, control circuit, camera, etc. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

In a typical processor-based device, such as the system 10, a processor 12, such as a microprocessor, controls the processing of system functions and requests in the system 10. Further, the processor 12 may comprise a plurality of processors that share system control. The processor 12 may be coupled directly or indirectly to each of the elements in the system 10, such that the processor 12 controls the system 10 by executing instructions that may be stored within the system 10 or external to the system 10.

In accordance with the embodiments described herein, the system 10 includes a state machine engine 14, which may operate under control of the processor 12. The state machine engine 14 may employ any automaton theory. For example, the state machine engine 14 may employ one of a number of state machine architectures, including, but not limited to Mealy architectures, Moore architectures, Finite State Machines (FSMs), Deterministic FSMs (DFSMs), Bit-Parallel State Machines (BPSMs), etc. Though a variety of architectures may be used, for discussion purposes, the application refers to FSMs. However, those skilled in the art will appreciate that the described techniques may be employed using any one of a variety of state machine architectures.

As discussed further below, the state machine engine 14 may include a number of (e.g., one or more) finite state machine (FSM) lattices (e.g., core of a chip). For purposes of this application the term "lattice" refers to an organized framework (e.g., routing matrix, routing network, frame) of elements (e.g., Boolean cells, counter cells, state machine elements, state transition elements). Furthermore, the "lattice" may have any suitable shape, structure, or hierarchical organization (e.g., grid, cube, spherical, cascading). Each FSM lattice may implement multiple FSMs that each receive and analyze the same data in parallel. Further, the FSM lattices may be arranged in groups (e.g., clusters), such that clusters of FSM lattices may analyze the same input data in parallel. Further, clusters of FSM lattices of the state machine engine 14 may be arranged in a hierarchical structure wherein outputs from state machine lattices on a lower level of the hierarchical structure may be used as inputs to state machine lattices on a higher level. By cascading clusters of parallel FSM lattices of the state machine engine 14 in series through the hierarchical structure, increasingly complex patterns may be analyzed (e.g., evaluated, searched, etc.).

Further, based on the hierarchical parallel configuration of the state machine engine 14, the state machine engine 14 can be employed for complex data analysis (e.g., pattern recognition or other processing) in systems that utilize high processing speeds. For instance, embodiments described herein may be incorporated in systems with processing speeds of 1 GByte/sec. Accordingly, utilizing the state machine engine 14, data from high speed memory devices or other external devices may be rapidly analyzed. The state machine engine 14 may analyze a data stream according to several criteria (e.g., search terms), at about the same time, e.g., during a single device cycle. Each of the FSM lattices within a cluster of FSMs on a level of the state machine engine 14 may each receive the same search term from the data stream at about the same time, and each of the parallel FSM lattices may determine whether the term advances the state machine engine 14 to the next state in the processing criterion. The state machine engine 14 may analyze terms according to a relatively large number of criteria, e.g., more than 100, more than 110, or more than 10,000. Because they operate in parallel, they may apply the criteria to a data stream having a relatively high bandwidth, e.g., a data stream of greater than or generally equal to 1 GByte/sec, without slowing the data stream.

In one embodiment, the state machine engine 14 may be configured to recognize (e.g., detect) a great number of patterns in a data stream. For instance, the state machine engine 14 may be utilized to detect a pattern in one or more of a variety of types of data streams that a user or other entity might wish to analyze. For example, the state machine engine 14 may be configured to analyze a stream of data received over a network, such as packets received over the Internet or voice or data received over a cellular network. In one example, the state machine engine 14 may be configured to analyze a data stream for spam or malware. The data stream may be received as a serial data stream, in which the data is received in an order that has meaning, such as in a temporally, lexically, or semantically significant order. Alternatively, the data stream may be received in parallel or out of order and, then, converted into a serial data stream, e.g., by reordering packets received over the Internet. In some embodiments, the data stream may present terms serially, but the bits expressing each of the terms may be received in parallel. The data stream may be received from a source external to the system 10, or may be formed by interrogating a memory device, such as the memory 16, and forming the data stream from data stored in the memory 16. In other examples, the state machine engine 14 may be configured to recognize a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase. The stream of data to be analyzed may include multiple bits of data in a binary format or other formats, e.g., base ten, ASCII, etc. The stream may encode the data with a single digit or multiple digits, e.g., several binary digits.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, that may provide data to be analyzed by the state machine engine 14. As used herein, the term "provide" may generically refer to direct, input, insert, issue, route, send, transfer, transmit, generate, give, output, place, write, etc. Such devices may be referred to as or include solid state drives (SSD's), MultimediaMediaCards (MMC's), Secure-Digital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12. Additionally, the system 10 may include an external storage 18, such as a magnetic storage device. The external storage may also provide input data to the state machine engine 14.

The system 10 may include a number of additional elements. For instance, a compiler 20 may be used to configure (e.g., program) the state machine engine 14, as described in more detail with regard to FIG. 8. An input device 22 may also be coupled to the processor 12 to allow a user to input data into the system 10. For instance, an input device 22 may be used to input data into the memory 16 for later analysis by the state machine engine 14. The input device 22 may include buttons, switching elements, a keyboard, a light pen, a stylus, a mouse, and/or a voice recognition system, for instance. An output device 24, such as a display may also be coupled to the processor 12. The display 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

FIGS. 2-5 illustrate an example of a FSM lattice 30. In an example, the FSM lattice 30 comprises an array of blocks 32. As will be described, each block 32 may include a plurality of selectively couple-able hardware elements (e.g., configurable elements and/or special purpose elements) that correspond to a plurality of states in a FSM. Similar to a state in a FSM, a hardware element can analyze an input stream and activate a downstream hardware element, based on the input stream.

The configurable elements can be configured (e.g., programmed) to implement many different functions. For instance, the configurable elements may include state machine elements (SMEs) 34, 36 (shown in FIG. 5) that are hierarchically organized into rows 38 (shown in FIGS. 3 and 4) and blocks 32 (shown in FIGS. 2 and 3). The SMEs may also be considered state transition elements (STEs). To route signals between the hierarchically organized SMEs 34, 36, a hierarchy of configurable switching elements can be used, including inter-block switching elements 40 (shown in FIGS. 2 and 3), intra-block switching elements 42 (shown in FIGS. 3 and 4) and intra-row switching elements 44 (shown in FIG. 4).

As described below, the switching elements may include routing structures and buffers. A SME 34, 36 can correspond to a state of a FSM implemented by the FSM lattice 30. The SMEs 34, 36 can be coupled together by using the configurable switching elements as described below. Accordingly, a FSM can be implemented on the FSM lattice 30 by configuring the SMEs 34, 36 to correspond to the functions of states and by selectively coupling together the SMEs 34, 36 to correspond to the transitions between states in the FSM.

Figure 2:
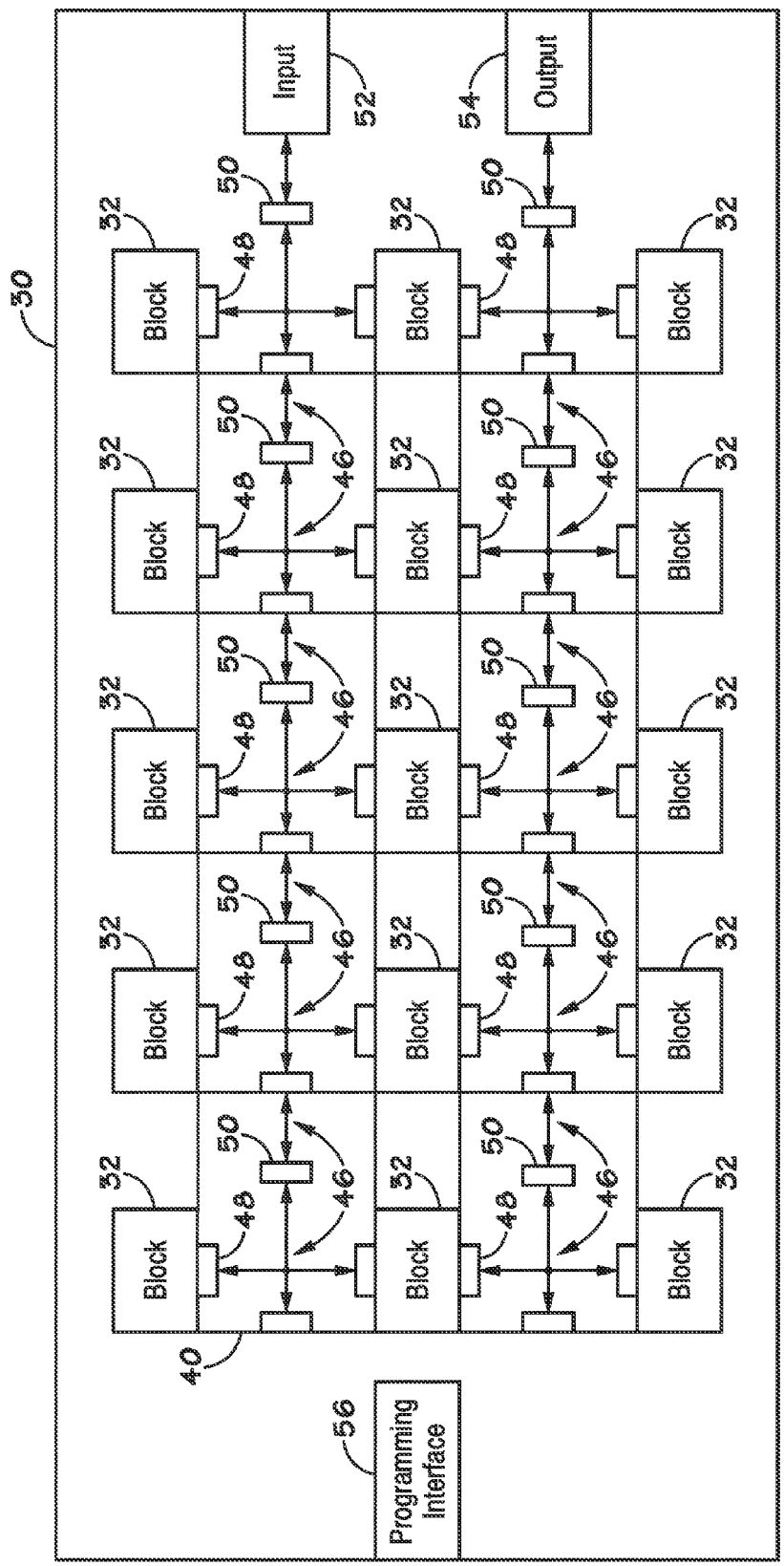
FIG. 2 illustrates an example of an FSM lattice of the state machine engine of FIG. 1, according to various embodiments of the invention.

FIG. 2 illustrates an overall view of an example of a FSM lattice 30. The FSM lattice 30 includes a plurality of blocks 32 that can be selectively coupled together with configurable inter-block switching elements 40. The inter-block switching elements 40 may include conductors 46 (e.g., wires, traces, etc.) and buffers 48 and 50. In an example, buffers 48 and 50 are included to control the connection and timing of signals to/from the inter-block switching elements 40. As described further below, the buffers 48 may be provided to buffer data being sent between blocks 32, while the buffers 50 may be provided to buffer data being sent between inter-block switching elements 40. Additionally, the blocks 32 can be selectively coupled to an input block 52 (e.g., a data input port) for receiving signals (e.g., data) and providing the data to the blocks 32. The blocks 32 can also be selectively coupled to an output block 54 (e.g., an output port) for providing signals from the blocks 32 to an external device (e.g., another FSM lattice 30). The FSM lattice 30 can also include a programming interface 56 to configure (e.g., via an image, program) the FSM lattice 30. The image can configure (e.g., set) the state of the SMEs 34, 36. For example, the image can configure the SMEs 34, 36 to react in a certain way to a given input at the input block 52. For example, a SME 34, 36 can be set to output a high signal when the character 'a' is received at the input block 52.

In an example, the input block 52, the output block 54, and/or the programming interface 56 can be implemented as registers such that writing to or reading from the registers provides data to or from the respective elements. Accordingly, bits from the image stored in the registers corresponding to the programming interface 56 can be loaded on the SMEs 34, 36. Although FIG. 2 illustrates a certain number of conductors (e.g., wire, trace) between a block 32, input block 52, output block 54, and an inter-block switching element 40, it should be understood that in other examples, fewer or more conductors may be used.

Figure 3:
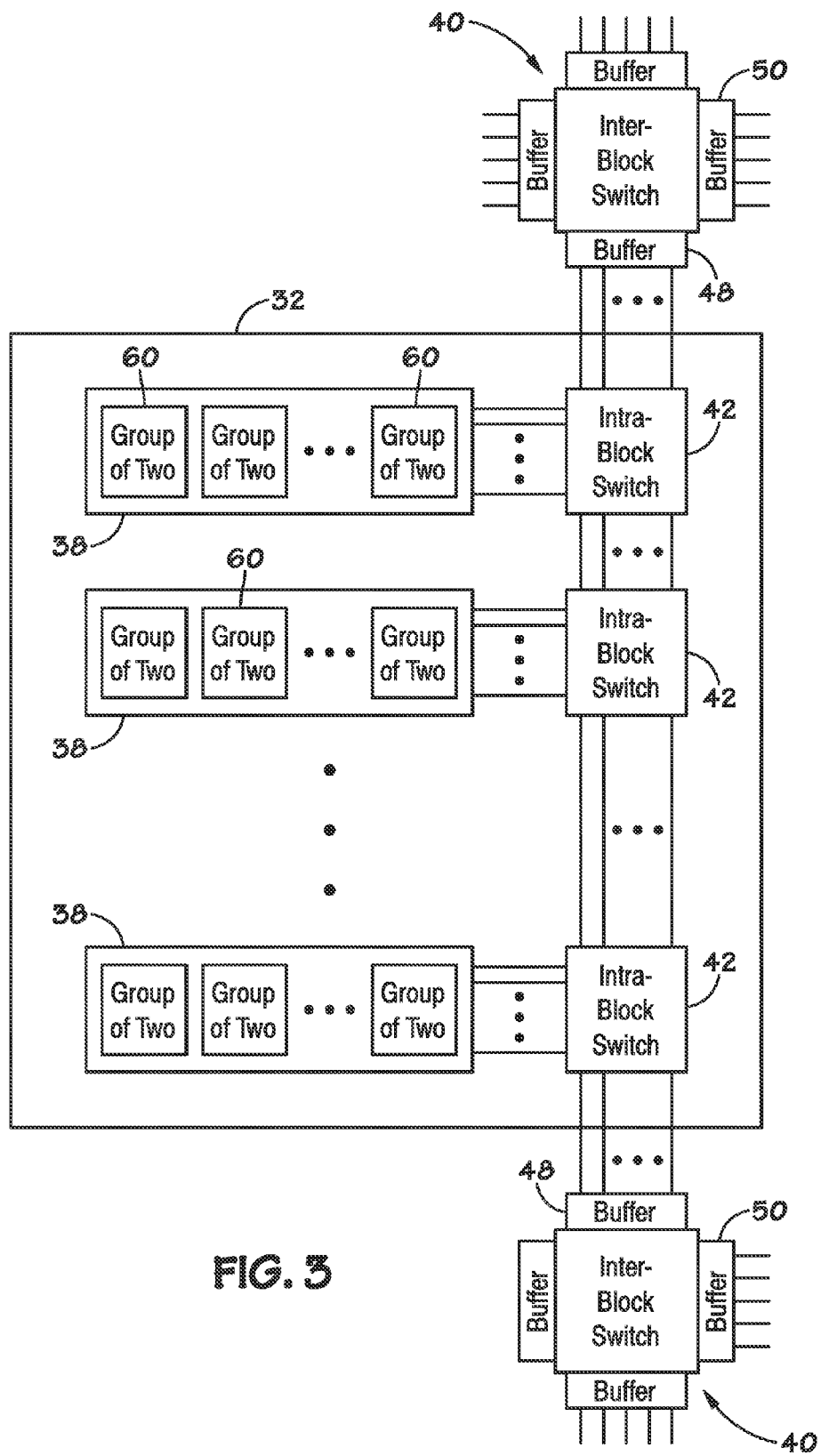
FIG. 3 illustrates an example of a block of the FSM lattice of FIG. 2, according to various embodiments of the invention.

FIG. 3 illustrates an example of a block 32. A block 32 can include a plurality of rows 38 that can be selectively coupled together with configurable intra-block switching elements 42. Additionally, a row 38 can be selectively coupled to another row 38 within another block 32 with the inter-block switching elements 40. A row 38 includes a plurality of SMEs 34, 36 organized into pairs of elements that are referred to herein as groups of two (GOTs) 60. In an example, a block 32 comprises sixteen (16) rows 38.

Figure 4:
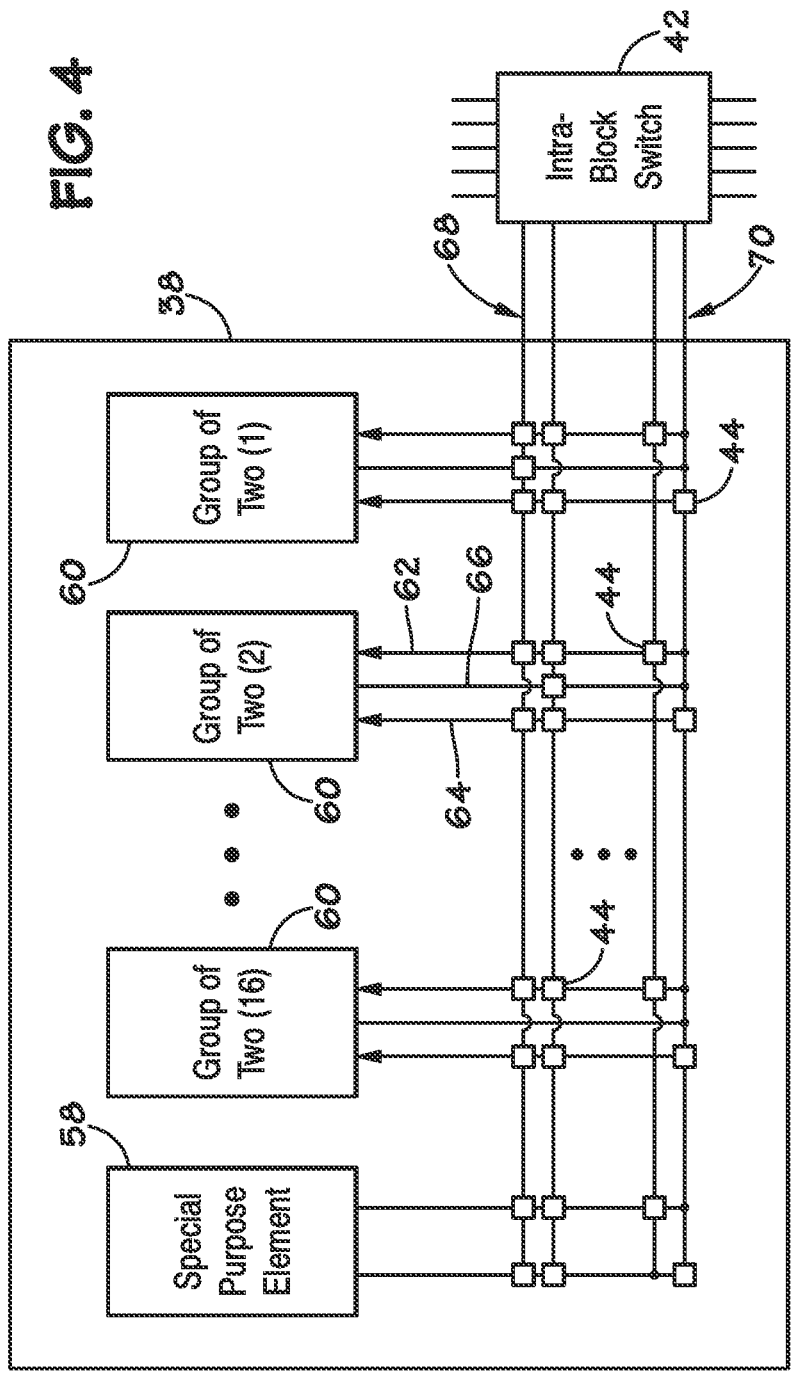
FIG. 4 illustrates an example of a row of the block of FIG. 3, according to various embodiments of the invention.

FIG. 4 illustrates an example of a row 38. A GOT 60 can be selectively coupled to other GOTs 60 and any other elements (e.g., a special purpose element 58) within the row 38 by configurable intra-row switching elements 44. A GOT 60 can also be coupled to other GOTs 60 in other rows 38 with the intra-block switching element 42, or other GOTs 60 in other blocks 32 with an inter-block switching element 40. In an example, a GOT 60 has a first and second input 62, 64, and an output 66. The first input 62 is coupled to a first SME 34 of the GOT 60 and the second input 64 is coupled to a second SME 36 of the GOT 60, as will be further illustrated with reference to FIG. 5.

In an example, the row 38 includes a first and second plurality of row interconnection conductors 68, 70. In an example, an input 62, 64 of a GOT 60 can be coupled to one or more row interconnection conductors 68, 70, and an output 66 can be coupled to one or more row interconnection conductor 68, 70. In an example, a first plurality of the row interconnection conductors 68 can be coupled to each SME 34, 36 of each GOT 60 within the row 38. A second plurality of the row interconnection conductors 70 can be coupled to only one SME 34, 36 of each GOT 60 within the row 38, but cannot be coupled to the other SME 34, 36 of the GOT 60. In an example, a first half of the second plurality of row interconnection conductors 70 can couple to first half of the SMEs 34, 36 within a row 38 (one SME 34 from each GOT 60) and a second half of the second plurality of row interconnection conductors 70 can couple to a second half of the SMEs 34, 36 within a row 38 (the other SME 34, 36 from each GOT 60), as will be better illustrated with respect to FIG. 5. The limited connectivity between the second plurality of row interconnection conductors 70 and the SMEs 34, 36 is referred to herein as "parity". In an example, the row 38 can also include a special purpose element 58 such as a counter, a configurable Boolean logic element, look-up table, RAM, a field configurable gate array (FPGA), an application specific integrated circuit (ASIC), a configurable processor (e.g., a microprocessor), or other element for performing a special purpose function.

In an example, the special purpose element 58 comprises a counter (also referred to herein as counter 58). In an example, the counter 58 comprises a 12-bit configurable down counter. The 12-bit configurable counter 58 has a counting input, a reset input, and zero-count output. The counting input, when asserted, decrements the value of the counter 58 by one. The reset input, when asserted, causes the counter 58 to load an initial value from an associated register. For the 12-bit counter 58, up to a 12-bit number can be loaded in as the initial value. When the value of the counter 58 is decremented to zero (0), the zero-count output is asserted. The counter 58 also has at least two modes, pulse and hold. When the counter 58 is set to pulse mode, the zero-count output is asserted when the counter 58 reaches zero. For example, the zero-count output is asserted during the processing of an immediately subsequent next data byte, which results in the counter 58 being offset in time with respect to the input character cycle. After the next character cycle, the zero-count output is no longer asserted. In this manner, for example, in the pulse mode, the zero-count output is asserted for one input character processing cycle. When the counter 58 is set to hold mode the zero-count output is asserted during the clock cycle when the counter 58 decrements to zero, and stays asserted until the counter 58 is reset by the reset input being asserted.

In another example, the special purpose element 58 comprises Boolean logic. For example, the Boolean logic may be used to perform logical functions, such as AND, OR, NAND, NOR, Sum of Products (SoP), Negated-Output Sum of Products (NSoP), Negated-Output Product of Sume (NPoS), and Product of Sums (PoS) functions. This Boolean logic can be used to extract data from terminal state SMEs (corresponding to terminal nodes of a FSM, as discussed later herein) in FSM lattice 30. The data extracted can be used to provide state data to other FSM lattices 30 and/or to provide configuring data used to reconfigure FSM lattice 30, or to reconfigure another FSM lattice 30.

Figure 5:
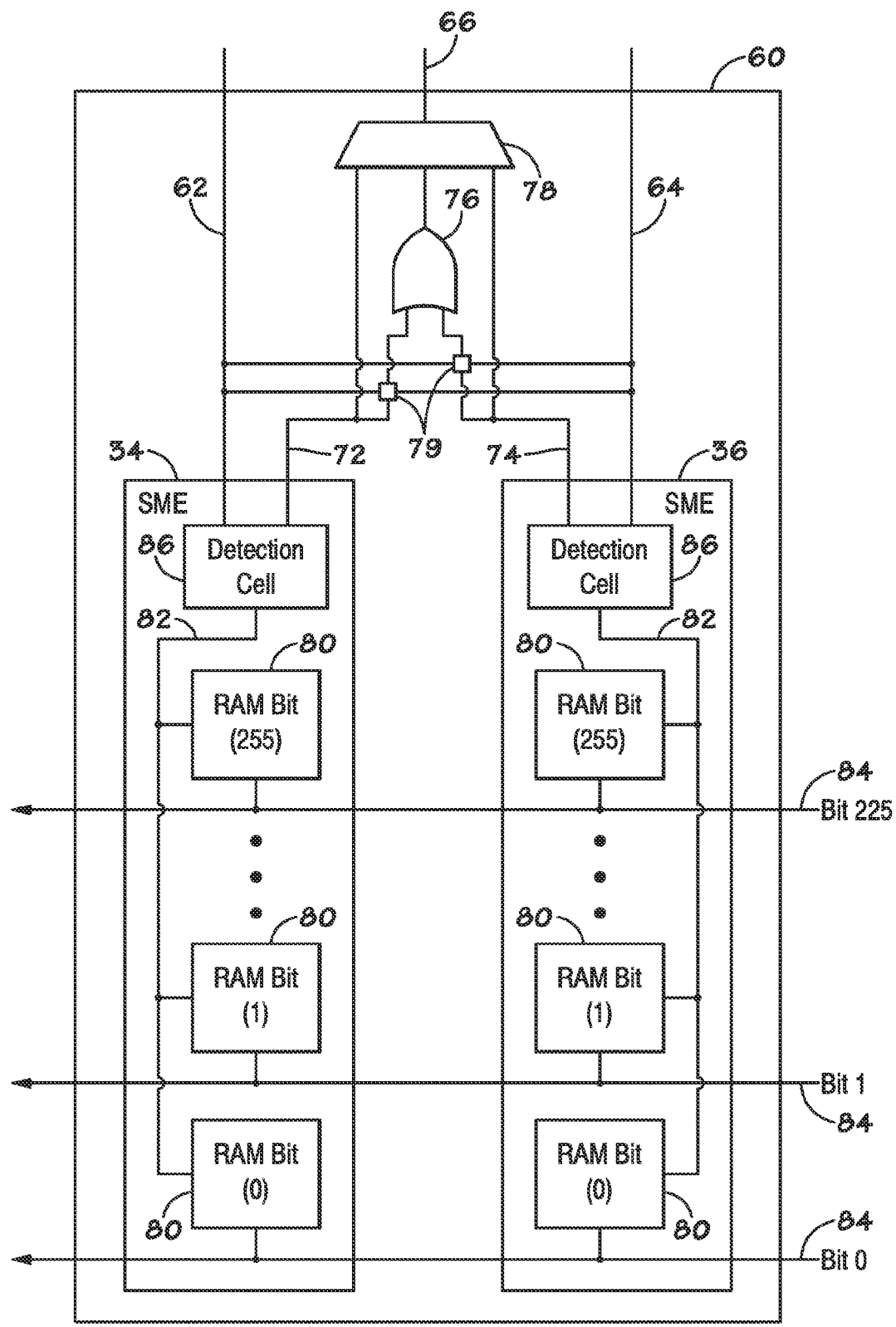
FIG. 5 illustrates an example of a Group of Two of the row of FIG. 4, according to various embodiments of the invention.

FIG. 5 illustrates an example of a GOT 60. The GOT 60 includes a first SME 34 and a second SME 36 having inputs 62, 64 and having their outputs 72, 74 coupled to an OR gate 76 and a 3-to-1 multiplexer 78. The 3-to-1 multiplexer 78 can be set to couple the output 66 of the GOT 60 to either the first SME 34, the second SME 36, or the OR gate 76. The OR gate 76 can be used to couple together both outputs 72, 74 to form the common output 66 of the GOT 60. In an example, the first and second SME 34, 36 exhibit parity, as discussed above, where the input 62 of the first SME 34 can be coupled to some of the row interconnection conductors 68 and the input 64 of the second SME 36 can be coupled to other row interconnection conductors 70 the common output 66 may be produced which may overcome parity problems. In an example, the two SMEs 34, 36 within a GOT 60 can be cascaded and/or looped back to themselves by setting either or both of switching elements 79. The SMEs 34, 36 can be cascaded by coupling the output 72, 74 of the SMEs 34, 36 to the input 62, 64 of the other SME 34, 36. The SMEs 34, 36 can be looped back to themselves by coupling the output 72, 74 to their own input 62, 64. Accordingly, the output 72 of the first SME 34 can be coupled to neither, one, or both of the input 62 of the first SME 34 and the input 64 of the second SME 36. Additionally, as each of the inputs 62, 64 may be coupled to a plurality of row routing lines, an OR gate may be utilized to select any of the inputs from these row routing lines along inputs 62, 64, as well as the outputs 72, 74.

In an example, a state machine element 34, 36 comprises a plurality of memory cells 80, such as those often used in dynamic random access memory (DRAM), coupled in parallel to a detect line 82. One such memory cell 80 comprises a memory cell that can be set to a data state, such as one that corresponds to either a high or a low value (e.g., a 1 or 0). The output of the memory cell 80 is coupled to the detect line 82 and the input to the memory cell 80 receives signals based on data on the data stream line 84. In an example, an input at the input block 52 is decoded to select one or more of the memory cells 80. The selected memory cell 80 provides its stored data state as an output onto the detect line 82. For example, the data received at the input block 52 can be provided to a decoder (not shown) and the decoder can select one or more of the data stream lines 84. In an example, the decoder can convert an 8-bit ACSII character to the corresponding 1 of 256 data stream lines 84.

A memory cell 80, therefore, outputs a high signal to the detect line 82 when the memory cell 80 is set to a high value and the data on the data stream line 84 selects the memory cell 80. When the data on the data stream line 84 selects the memory cell 80 and the memory cell 80 is set to a low value, the memory cell 80 outputs a low signal to the detect line 82. The outputs from the memory cells 80 on the detect line 82 are sensed by a detection cell 86.

In an example, the signal on an input line 62, 64 sets the respective detection cell 86 to either an active or inactive state. When set to the inactive state, the detection cell 86 outputs a low signal on the respective output 72, 74 regardless of the signal on the respective detect line 82. When set to an active state, the detection cell 86 outputs a high signal on the respective output line 72, 74 when a high signal is detected from one of the memory cells 82 of the respective SME 34, 36. When in the active state, the detection cell 86 outputs a low signal on the respective output line 72, 74 when the signals from all of the memory cells 82 of the respective SME 34, 36 are low.

In an example, an SME 34, 36 includes 256 memory cells 80 and each memory cell 80 is coupled to a different data stream line 84. Thus, an SME 34, 36 can be programmed to output a high signal when a selected one or more of the data stream lines 84 have a high signal thereon. For example, the SME 34 can have a first memory cell 80 (e.g., bit 0) set high and all other memory cells 80 (e.g., bits 1-255) set low. When the respective detection cell 86 is in the active state, the SME 34 outputs a high signal on the output 72 when the data stream line 84 corresponding to bit 0 has a high signal thereon. In other examples, the SME 34 can be set to output a high signal when one of multiple data stream lines 84 have a high signal thereon by setting the appropriate memory cells 80 to a high value.

In an example, a memory cell 80 can be set to a high or low value by reading bits from an associated register. Accordingly, the SMEs 34 can be configured by storing an image created by the compiler 20 into the registers and loading the bits in the registers into associated memory cells 80. In an example, the image created by the compiler 20 includes a binary image of high and low (e.g., 1 and 0) bits. The image can configure the FSM lattice 30 to implement a FSM by cascading the SMEs 34, 36. For example, a first SME 34 can be set to an active state by setting the detection cell 86 to the active state. The first SME 34 can be set to output a high signal when the data stream line 84 corresponding to bit 0 has a high signal thereon. The second SME 36 can be initially set to an inactive state, but can be set to, when active, output a high signal when the data stream line 84 corresponding to bit 1 has a high signal thereon. The first SME 34 and the second SME 36 can be cascaded by setting the output 72 of the first SME 34 to couple to the input 64 of the second SME 36. Thus, when a high signal is sensed on the data stream line 84 corresponding to bit 0, the first SME 34 outputs a high signal on the output 72 and sets the detection cell 86 of the second SME 36 to an active state. When a high signal is sensed on the data stream line 84 corresponding to bit 1, the second SME 36 outputs a high signal on the output 74 to activate another SME 36 or for output from the FSM lattice 30.

In an example, a single FSM lattice 30 is implemented on a single physical device, however, in other examples two or more FSM lattices 30 can be implemented on a single physical device (e.g., physical chip). In an example, each FSM lattice 30 can include a distinct data input block 52, a distinct output block 54, a distinct programming interface 56, and a distinct set of configurable elements. Moreover, each set of configurable elements can react (e.g., output a high or low signal) to data at their corresponding data input block 52. For example, a first set of configurable elements corresponding to a first FSM lattice 30 can react to the data at a first data input block 52 corresponding to the first FSM lattice 30. A second set of configurable elements corresponding to a second FSM lattice 30 can react to a second data input block 52 corresponding to the second FSM lattice 30. Accordingly, each FSM lattice 30 includes a set of configurable elements, wherein different sets of configurable elements can react to different input data. Similarly, each FSM lattice 30, and each corresponding set of configurable elements can provide a distinct output. In some examples, an output block 54 from a first FSM lattice 30 can be coupled to an input block 52 of a second FSM lattice 30, such that input data for the second FSM lattice 30 can include the output data from the first FSM lattice 30 in a hierarchical arrangement of a series of FSM lattices 30.

In an example, an image for loading onto the FSM lattice 30 comprises a plurality of bits of data for configuring the configurable elements, the configurable switching elements, and the special purpose elements within the FSM lattice 30. In an example, the image can be loaded onto the FSM lattice 30 to configure the FSM lattice 30 to provide a desired output based on certain inputs. The output block 54 can provide outputs from the FSM lattice 30 based on the reaction of the configurable elements to data at the data input block 52. An output from the output block 54 can include a single bit indicating a match of a given pattern, a word comprising a plurality of bits indicating matches and non-matches to a plurality of patterns, and a state vector corresponding to the state of all or certain configurable elements at a given moment. As described, a number of FSM lattices 30 may be included in a state machine engine, such as state machine engine 14, to perform data analysis, such as pattern-recognition (e.g., speech recognition, image recognition, etc.) signal processing, imaging, computer vision, cryptography, and others.

FIG. 6 illustrates an example model of a finite state machine (FSM) that can be implemented by the FSM lattice 30. The FSM lattice 30 can be configured (e.g., programmed) as a physical implementation of a FSM. A FSM can be represented as a diagram 90, (e.g., directed graph, undirected graph, pseudograph), which contains one or more root nodes 92. In addition to the root nodes 92, the FSM can be made up of several standard nodes 94 and terminal nodes 96 that are connected to the root nodes 92 and other standard nodes 94 through one or more edges 98. A node 92, 94, 96 corresponds to a state in the FSM. The edges 98 correspond to the transitions between the states.

Each of the nodes 92, 94, 96 can be in either an active or an inactive state. When in the inactive state, a node 92, 94, 96 does not react (e.g., respond) to input data. When in an active state, a node 92, 94, 96 can react to input data. An upstream node 92, 94 can react to the input data by activating a node 94, 96 that is downstream from the node when the input data matches criteria specified by an edge 98 between the upstream node 92, 94 and the downstream node 94, 96. For example, a first node 94 that specifies the character 'b' will activate a second node 94 connected to the first node 94 by an edge 98 when the first node 94 is active and the character 'b' is received as input data. As used herein, "upstream" refers to a relationship between one or more nodes, where a first node that is upstream of one or more other nodes (or upstream of itself in the case of a loop or feedback configuration) refers to the situation in which the first node can activate the one or more other nodes (or can activate itself in the case of a loop). Similarly, "downstream" refers to a relationship where a first node that is downstream of one or more other nodes (or downstream of itself in the case of a loop) can be activated by the one or more other nodes (or can be activated by itself in the case of a loop). Accordingly, the terms "upstream" and "downstream" are used herein to refer to relationships between one or more nodes, but these terms do not preclude the use of loops or other non-linear paths among the nodes.

In the diagram 90, the root node 92 can be initially activated and can activate downstream nodes 94 when the input data matches an edge 98 from the root node 92. Nodes 94 can activate nodes 96 when the input data matches an edge 98 from the node 94. Nodes 94, 96 throughout the diagram 90 can be activated in this manner as the input data is received. A terminal node 96 corresponds to a match of a sequence of interest in the input data. Accordingly, activation of a terminal node 96 indicates that a sequence of interest has been received as the input data. In the context of the FSM lattice 30 implementing a pattern recognition function, arriving at a terminal node 96 can indicate that a specific pattern of interest has been detected in the input data.

In an example, each root node 92, standard node 94, and terminal node 96 can correspond to a configurable element in the FSM lattice 30. Each edge 98 can correspond to connections between the configurable elements. Thus, a standard node 94 that transitions to (e.g., has an edge 98 connecting to) another standard node 94 or a terminal node 96 corresponds to a configurable element that transitions to (e.g., provides an output to) another configurable element. In some examples, the root node 92 does not have a corresponding configurable element.

As will be appreciated, although the node 92 is described as a root node and nodes 96 are described as terminal nodes, there may not necessarily be a particular "start" or root node and there may not necessarily be a particular "end" or output node. In other words, any node may be a starting point and any node may provide output.

When the FSM lattice 30 is programmed, each of the configurable elements can also be in either an active or inactive state. A given configurable element, when inactive, does not react to the input data at a corresponding data input block 52. An active configurable element can react to the input data at the data input block 52, and can activate a downstream configurable element when the input data matches the setting of the configurable element. When a configurable element corresponds to a terminal node 96, the configurable element can be coupled to the output block 54 to provide an indication of a match to an external device.

An image loaded onto the FSM lattice 30 via the programming interface 56 can configure the configurable elements and special purpose elements, as well as the connections between the configurable elements and special purpose elements, such that a desired FSM is implemented through the sequential activation of nodes based on reactions to the data at the data input block 52. In an example, a configurable element remains active for a single data cycle (e.g., a single character, a set of characters, a single clock cycle) and then becomes inactive unless re-activated by an upstream configurable element.

A terminal node 96 can be considered to store a compressed history of past events. For example, the one or more patterns of input data required to reach a terminal node 96 can be represented by the activation of that terminal node 96. In an example, the output provided by a terminal node 96 is binary, for example, the output indicates whether the pattern of interest has been matched or not. The ratio of terminal nodes 96 to standard nodes 94 in a diagram 90 may be quite small. In other words, although there may be a high complexity in the FSM, the output of the FSM may be small by comparison.

In an example, the output of the FSM lattice 30 can comprise a state vector. The state vector comprises the state (e.g., activated or not activated) of configurable elements of the FSM lattice 30. In another example, the state vector can include the state of all or a subset of the configurable elements whether or not the configurable elements corresponds to a terminal node 96. In an example, the state vector includes the states for the configurable elements corresponding to terminal nodes 96. Thus, the output can include a collection of the indications provided by all terminal nodes 96 of a diagram 90. The state vector can be represented as a word, where the binary indication provided by each terminal node 96 comprises one bit of the word. This encoding of the terminal nodes 96 can provide an effective indication of the detection state (e.g., whether and what sequences of interest have been detected) for the FSM lattice 30.

As mentioned above, the FSM lattice 30 can be programmed to implement a pattern recognition function. For example, the FSM lattice 30 can be configured to recognize one or more data sequences (e.g., signatures, patterns) in the input data. When a data sequence of interest is recognized by the FSM lattice 30, an indication of that recognition can be provided at the output block 54. In an example, the pattern recognition can recognize a string of symbols (e.g., ASCII characters) to, for example, identify malware or other data in network data.

Figure 7:
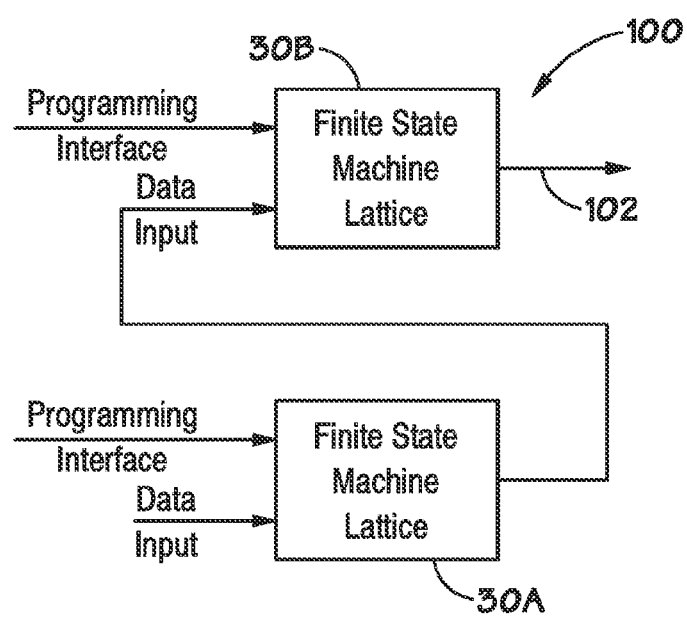
FIG. 7 illustrates an example of two-level hierarchy implemented with FSM lattices, according to various embodiments of the invention.

FIG. 7 illustrates an example of hierarchical structure 100, wherein two levels of FSM lattices 30 are coupled in series and used to analyze data. Specifically, in the illustrated embodiment, the hierarchical structure 100 includes a first FSM lattice 30A and a second FSM lattice 30B arranged in series. Each FSM lattice 30 includes a respective data input block 52 to receive data input, a programming interface block 56 to receive configuring signals and an output block 54.

The first FSM lattice 30A is configured to receive input data, for example, raw data at a data input block. The first FSM lattice 30A reacts to the input data as described above and provides an output at an output block. The output from the first FSM lattice 30A is sent to a data input block of the second FSM lattice 30B. The second FSM lattice 30B can then react based on the output provided by the first FSM lattice 30A and provide a corresponding output signal 102 of the hierarchical structure 100. This hierarchical coupling of two FSM lattices 30A and 30B in series provides a means to provide data regarding past events in a compressed word from a first FSM lattice 30A to a second FSM lattice 30B. The data provided can effectively be a summary of complex events (e.g., sequences of interest) that were recorded by the first FSM lattice 30A.

The two-level hierarchy 100 of FSM lattices 30A, 30B shown in FIG. 7 allows two independent programs to operate based on the same data stream. The two-stage hierarchy can be similar to visual recognition in a biological brain which is modeled as different regions. Under this model, the regions are effectively different pattern recognition engines, each performing a similar computational function (pattern matching) but using different programs (signatures). By connecting multiple FSM lattices 30A, 30B together, increased knowledge about the data stream input may be obtained.

The first level of the hierarchy (implemented by the first FSM lattice 30A) can, for example, perform processing directly on a raw data stream. For example, a raw data stream can be received at an input block 52 of the first FSM lattice 30A and the configurable elements of the first FSM lattice 30A can react to the raw data stream. The second level (implemented by the second FSM lattice 30B) of the hierarchy can process the output from the first level. For example, the second FSM lattice 30B receives the output from an output block 54 of the first FSM lattice 30A at an input block 52 of the second FSM lattice 30B and the configurable elements of the second FSM lattice 30B can react to the output of the first FSM lattice 30A. Accordingly, in this example, the second FSM lattice 30B does not receive the raw data stream as an input, but rather receives the indications of patterns of interest that are matched by the raw data stream as determined by the first FSM lattice 30A. The second FSM lattice 30B can implement a FSM that recognizes patterns in the output data stream from the first FSM lattice 30A. It should be appreciated that the second FSM lattice 30B may receive inputs from multiple other FSM lattices in addition to receiving output from the FSM lattice 30A. Likewise, the second FSM lattice 30B may receive inputs from other devices. The second FSM lattice 30B may combine these multiple inputs to produce outputs.

Figure 8:
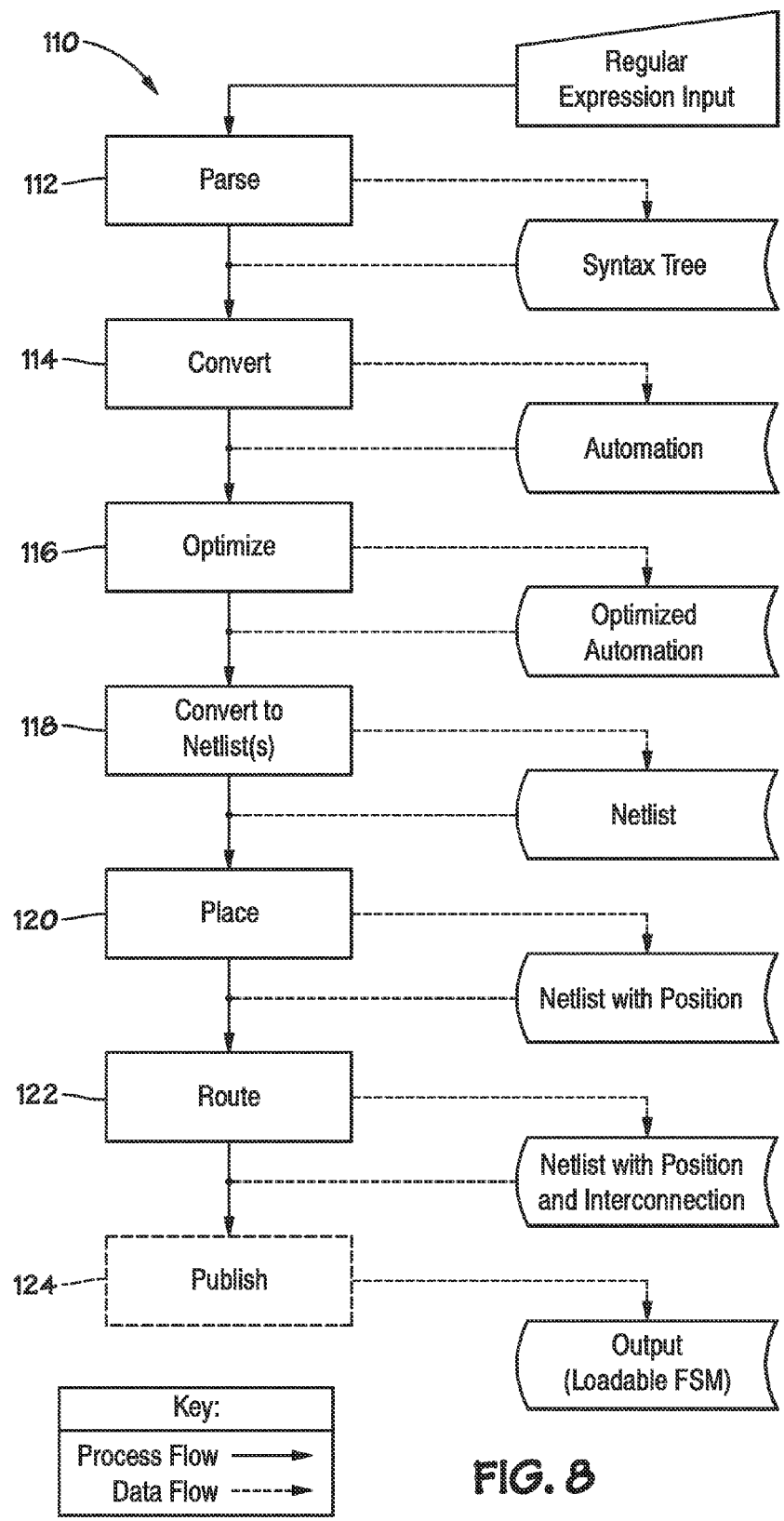
FIG. 8 illustrates an example of a method for a compiler to convert source code into a binary file for programming of the FSM lattice of FIG. 2, according to various embodiments of the invention.

FIG. 8 illustrates an example of a method 110 for a compiler to convert source code into an image used to configure a FSM lattice, such as lattice 30, to implement a FSM. Method 110 includes parsing the source code into a syntax tree (block 112), converting the syntax tree into an automaton (block 114), optimizing the automaton (block 116), converting the automaton into a netlist (block 118), placing the netlist on hardware (block 120), routing the netlist (block 122), and publishing the resulting image (block 124).

In an example, the compiler 20 includes an application programming interface (API) that allows software developers to create images for implementing FSMs on the FSM lattice 30. The compiler 20 provides methods to convert an input set of regular expressions in the source code into an image that is configured to configure the FSM lattice 30. The compiler 20 can be implemented by instructions for a computer having a von Neumann architecture. These instructions can cause a processor 12 on the computer to implement the functions of the compiler 20. For example, the instructions, when executed by the processor 12, can cause the processor 12 to perform actions as described in blocks 112, 114, 116, 118, 120, 122, and 124 on source code that is accessible to the processor 12.

In an example, the source code describes search strings for identifying patterns of symbols within a group of symbols. To describe the search strings, the source code can include a plurality of regular expressions (regexs). A regex can be a string for describing a symbol search pattern. Regexes are widely used in various computer domains, such as programming languages, text editors, network security, and others. In an example, the regular expressions supported by the compiler include criteria for the analysis of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

At block 112 the compiler 20 can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexes in the source code in the form of a tree graph known as a syntax tree. The examples described herein refer to the arrangement as a syntax tree (also known as an "abstract syntax tree") in other examples, however, a concrete syntax tree or other arrangement can be used.

Since, as mentioned above, the compiler 20 can support multiple languages of source code, parsing converts the source code, regardless of the language, into a non-language specific representation, e.g., a syntax tree. Thus, further processing (blocks 114, 116, 118, 120) by the compiler 20 can work from a common input structure regardless of the language of the source code.

As noted above, the syntax tree includes a plurality of operators that are relationally connected. A syntax tree can include multiple different types of operators. For example, different operators can correspond to different functions implemented by the regexes in the source code.

At block 114, the syntax tree is converted into an automaton. An automaton comprises a software model of a FSM and can accordingly be classified as deterministic or non-deterministic. A deterministic automaton has a single path of execution at a given time, while a non-deterministic automaton has multiple concurrent paths of execution. The automaton comprises a plurality of states. In order to convert the syntax tree into an automaton, the operators and relationships between the operators in the syntax tree are converted into states with transitions between the states. In an example, the automaton can be converted based partly on the hardware of the FSM lattice 30.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol α, i.e. δ(p,α), is shown by a directed connection from node p to node q. In an example, a reversal of an automaton produces a new automaton where each transition p→q on some symbol α is reversed q→p on the same symbol. In a reversal, start state becomes a final state and the final states become start states. In an example, the language recognized (e.g., matched) by an automaton is the set of all possible character strings which when input sequentially into the automaton will reach a final state. Each string in the language recognized by the automaton traces a path from the start state to one or more final states.

At block 116, after the automaton is constructed, the automaton is optimized to reduce its complexity and size, among other things. The automaton can be optimized by combining redundant states.

At block 118, the optimized automaton is converted into a netlist. Converting the automaton into a netlist maps each state of the automaton to a hardware element (e.g., SMEs 34, 36, other elements) on the FSM lattice 30, and determines the connections between the hardware elements.

At block 120, the netlist is placed to select a specific hardware element of the target device (e.g., SMEs 34, 36, special purpose elements 58) corresponding to each node of the netlist. In an example, placing selects each specific hardware element based on general input and output constraints for of the FSM lattice 30.

At block 122, the placed netlist is routed to determine the settings for the configurable switching elements (e.g., inter-block switching elements 40, intra-block switching elements 42, and intra-row switching elements 44) in order to couple the selected hardware elements together to achieve the connections describe by the netlist. In an example, the settings for the configurable switching elements are determined by determining specific conductors of the FSM lattice 30 that will be used to connect the selected hardware elements, and the settings for the configurable switching elements. Routing can take into account more specific limitations of the connections between the hardware elements that placement at block 120. Accordingly, routing may adjust the location of some of the hardware elements as determined by the global placement in order to make appropriate connections given the actual limitations of the conductors on the FSM lattice 30.

Once the netlist is placed and routed, the placed and routed netlist can be converted into a plurality of bits for configuring a FSM lattice 30. The plurality of bits are referred to herein as an image (e.g., binary image).

At block 124, an image is published by the compiler 20. The image comprises a plurality of bits for configuring specific hardware elements of the FSM lattice 30. The bits can be loaded onto the FSM lattice 30 to configure the state of SMEs 34, 36, the special purpose elements 58, and the configurable switching elements such that the programmed FSM lattice 30 implements a FSM having the functionality described by the source code. Placement (block 120) and routing (block 122) can map specific hardware elements at specific locations in the FSM lattice 30 to specific states in the automaton. Accordingly, the bits in the image can configure the specific hardware elements to implement the desired function(s). In an example, the image can be published by saving the machine code to a computer readable medium. In another example, the image can be published by displaying the image on a display device. In still another example, the image can be published by sending the image to another device, such as a configuring device for loading the image onto the FSM lattice 30. In yet another example, the image can be published by loading the image onto a FSM lattice (e.g., the FSM lattice 30).

In an example, an image can be loaded onto the FSM lattice 30 by either directly loading the bit values from the image to the SMEs 34, 36 and other hardware elements or by loading the image into one or more registers and then writing the bit values from the registers to the SMEs 34, 36 and other hardware elements. In an example, the hardware elements (e.g., SMEs 34, 36, special purpose elements 58, configurable switching elements 40, 42, 44) of the FSM lattice 30 are memory mapped such that a configuring device and/or computer can load the image onto the FSM lattice 30 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 9:
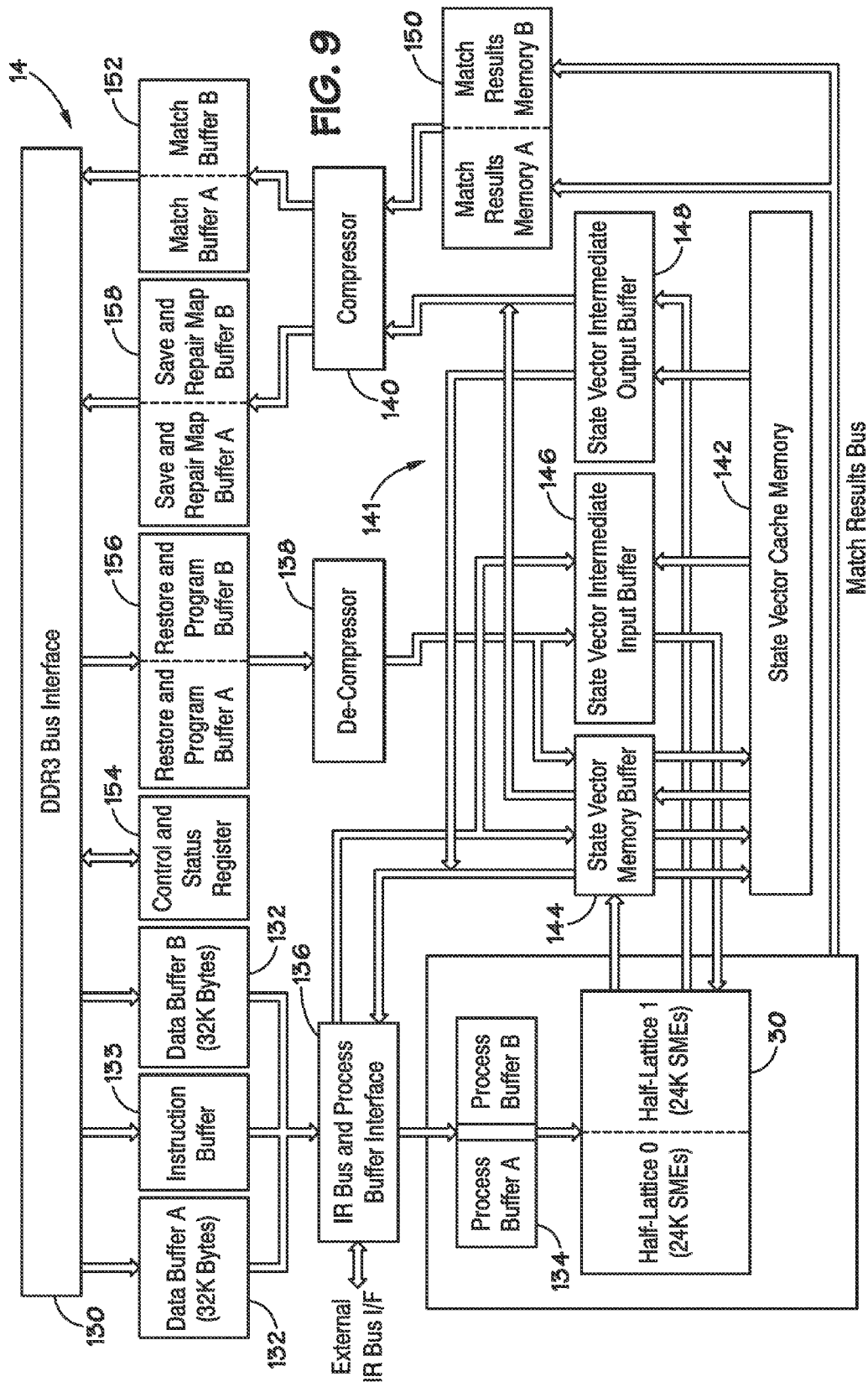
FIG. 9 illustrates a state machine engine, according to various embodiments of the invention.

Referring now to FIG. 9, an embodiment of the state machine engine 14 (e.g., a single device on a single chip) is illustrated. As previously described, the state machine engine 14 is configured to receive data from a source, such as the memory 16 over a data bus. In the illustrated embodiment, data may be sent to the state machine engine 14 through a bus interface, such as a double data rate three (DDR3) bus interface 130. The DDR3 bus interface 130 may be capable of exchanging (e.g., providing and receiving) data at a rate greater than or equal to 1 GByte/sec. Such a data exchange rate may be greater than a rate that data is analyzed by the state machine engine 14. As will be appreciated, depending on the source of the data to be analyzed, the bus interface 130 may be any suitable bus interface for exchanging data to and from a data source to the state machine engine 14, such as a NAND Flash interface, peripheral component interconnect (PCI) interface, gigabit media independent interface (GMMI), etc. As previously described, the state machine engine 14 includes one or more FSM lattices 30 configured to analyze data. Each FSM lattice 30 may be divided into two half-lattices. In the illustrated embodiment, each half lattice may include 24K SMEs (e.g., SMEs 34, 36), such that the lattice 30 includes 48K SMEs. The lattice 30 may comprise any desirable number of SMEs, arranged as previously described with regard to FIGS. 2-5. Further, while only one FSM lattice 30 is illustrated, the state machine engine 14 may include multiple FSM lattices 30, as previously described.

Data to be analyzed may be received at the bus interface 130 and provided to the FSM lattice 30 through a number of buffers and buffer interfaces. In the illustrated embodiment, the data path includes data buffers 132, an instruction buffer 133, process buffers 134, and an intra-rank (IR) bus and process buffer interface 136. The data buffers 132 are configured to receive and temporarily store data to be analyzed. In one embodiment, there are two data buffers 132 (data buffer A and data buffer B). Data may be stored in one of the two data buffers 132, while data is being emptied from the other data buffer 132, for analysis by the FSM lattice 30. The bus interface 130 may be configured to provide data to be analyzed to the data buffers 132 until the data buffers 132 are full. After the data buffers 132 are full, the bus interface 130 may be configured to be free to be used for other purposes (e.g., to provide other data from a data stream until the data buffers 132 are available to receive additional data to be analyzed). In the illustrated embodiment, the data buffers 132 may be 32 KBytes each. The instruction buffer 133 is configured to receive instructions from the processor 12 via the bus interface 130, such as instructions that correspond to the data to be analyzed and instructions that correspond to configuring the state machine engine 14. The IR bus and process buffer interface 136 may facilitate providing data to the process buffer 134. The IR bus and process buffer interface 136 can be used to ensure that data is processed by the FSM lattice 30 in order. The IR bus and process buffer interface 136 may coordinate the exchange of data, timing data, packing instructions, etc. such that data is received and analyzed correctly. Generally, the IR bus and process buffer interface 136 allows the analyzing of multiple data sets in parallel through a logical rank of FSM lattices 30. For example, multiple physical devices (e.g., state machine engines 14, chips, separate devices) may be arranged in a rank and may provide data to each other via the IR bus and process buffer interface 136. For purposes of this application the term "rank" refers to a set of state machine engines 14 connected to the same chip select. In the illustrated embodiment, the IR bus and process buffer interface 136 may include a 32 bit data bus. In other embodiments, the IR bus and process buffer interface 136 may include any suitable data bus, such as a 128 bit data bus.

In the illustrated embodiment, the state machine engine 14 also includes a de-compressor 138 and a compressor 140 to aid in providing state vector data through the state machine engine 14. The compressor 140 and de-compressor 138 work in conjunction such that the state vector data can be compressed to minimize the data providing times. By compressing the state vector data, the bus utilization time may be minimized. The compressor 140 and de-compressor 138 can also be configured to handle state vector data of varying burst lengths. By padding compressed state vector data and including an indicator as to when each compressed region ends, the compressor 140 may improve the overall processing speed through the state machine engine 14. The compressor 140 may be used to compress match results data after analysis by the FSM lattice 30. In one embodiment, the compressor 140 and de-compressor 138 may be disabled (e.g., turned off) such that data flowing to and/or from the compressor 140 and de-compressor 138 is not modified.

As previously described, an output of the FSM lattice 30 can comprise a state vector. The state vector comprises the state (e.g., activated or not activated) of the SMEs 34, 36 of the FSM lattice 30 and the dynamic (e.g., current) count of the counter 58. The state machine engine 14 includes a state vector system 141 having a state vector cache memory 142, a state vector memory buffer 144, a state vector intermediate input buffer 146, and a state vector intermediate output buffer 148. The state vector system 141 may be used to store multiple state vectors of the FSM lattice 30 and to provide a state vector to the FSM lattice 30 to restore the FSM lattice 30 to a state corresponding to the provided state vector. Each state vector may be temporarily stored in the state vector cache memory 142. For example, the state of each SME 34, 36 may be stored, such that the state may be restored and used in further analysis at a later time, while freeing the SMEs 34, 36 for further analysis of a new data set (e.g., search term). Like a typical cache, the state vector cache memory 142 allows storage of state vectors for quick retrieval and use, here by the FSM lattice 30, for instance. In the illustrated embodiment, the state vector cache memory 142 may store up to 512 state vectors.

As will be appreciated, the state vector data may be exchanged between different state machine engines 14 (e.g., chips) in a rank. The state vector data may be exchanged between the different state machine engines 14 for various purposes such as: to synchronize the state of the SMEs 34, 36 of the FSM lattices 30 of the state machine engines 14, to perform the same functions across multiple state machine engines 14, to reproduce results across multiple state machine engines 14, to cascade results across multiple state machine engines 14, to store a history of states of the SMEs 34, 36 used to analyze data that is cascaded through multiple state machine engines 14, and so forth. Furthermore, it should be noted that within a state machine engine 14, the state vector data may be used to quickly configure the SMEs 34, 36 of the FSM lattice 30. For example, the state vector data may be used to restore the state of the SMEs 34, 36 to an initialized state (e.g., to search for a new search term), to restore the state of the SMEs 34, 36 to prior state (e.g., to search for a previously searched search term), and to change the state of the SMEs 34, 36 to be configured for a cascading configuration (e.g., to search for a search term in a cascading search). In certain embodiments, the state vector data may be provided to the bus interface 130 so that the state vector data may be provided to the processor 12 (e.g., for analysis of the state vector data, reconfiguring the state vector data to apply modifications, reconfiguring the state vector data to improve efficiency of the SMEs 34, 36, and so forth).

For example, in certain embodiments, the state machine engine 14 may provide cached state vector data (e.g., data stored by the state vector system 141) from the FSM lattice 30 to an external device. The external device may receive the state vector data, modify the state vector data, and provide the modified state vector data to the state machine engine 14 for configuring the FSM lattice 30. Accordingly, the external device may modify the state vector data so that the state machine engine 14 may skip states (e.g., jump around) as desired.

The state vector cache memory 142 may receive state vector data from any suitable device. For example, the state vector cache memory 142 may receive a state vector from the FSM lattice 30, another FSM lattice 30 (e.g., via the IR bus and process buffer interface 136), the de-compressor 138, and so forth. In the illustrated embodiment, the state vector cache memory 142 may receive state vectors from other devices via the state vector memory buffer 144. Furthermore, the state vector cache memory 142 may provide state vector data to any suitable device. For example, the state vector cache memory 142 may provide state vector data to the state vector memory buffer 144, the state vector intermediate input buffer 146, and the state vector intermediate output buffer 148.

Additional buffers, such as the state vector memory buffer 144, state vector intermediate input buffer 146, and state vector intermediate output buffer 148, may be utilized in conjunction with the state vector cache memory 142 to accommodate retrieval and storage of state vectors, while processing separate data sets with interleaved packets through the state machine engine 14. In the illustrated embodiment, each of the state vector memory buffer 144, the state vector intermediate input buffer 146, and the state vector intermediate output buffer 148 may be configured to temporarily store one state vector. The state vector memory buffer 144 may be used to receive state vector data from any suitable device and to provide state vector data to any suitable device. For example, the state vector memory buffer 144 may be used to receive a state vector from the FSM lattice 30, another FSM lattice 30 (e.g., via the IR bus and process buffer interface 136), the de-compress or 138, and the state vector cache memory 142. As another example, the state vector memory buffer 144 may be used to provide state vector data to the IR bus and process buffer interface 136 (e.g., for other FSM lattices 30), the compressor 140, and the state vector cache memory 142.

Likewise, the state vector intermediate input buffer 146 may be used to receive state vector data from any suitable device and to provide state vector data to any suitable device. For example, the state vector intermediate input buffer 146 may be used to receive a state vector from an FSM lattice 30 (e.g., via the IR bus and process buffer interface 136), the de-compressor 138, and the state vector cache memory 142. As another example, the state vector intermediate input buffer 146 may be used to provide a state vector to the FSM lattice 30. Furthermore, the state vector intermediate output buffer 148 may be used to receive a state vector from any suitable device and to provide a state vector to any suitable device. For example, the state vector intermediate output buffer 148 may be used to receive a state vector from the FSM lattice 30 and the state vector cache memory 142. As another example, the state vector intermediate output buffer 148 may be used to provide a state vector to an FSM lattice 30 (e.g., via the IR bus and process buffer interface 136) and the compressor 140.

Once a result of interest is provided by the FSM lattice 30, the result (e.g., a match result) may be stored in a storage element, such as a results memory 150. For example, a "match vector" indicating a match (e.g., detection of a pattern of interest) may be stored in the results memory 150. The match result can then be provided to a match buffer 152 for provision over the bus interface 130 to a processor 12, for example. As previously described, the match results may be compressed.

Additional registers and buffers may be provided in the state machine engine 14, as well. For instance, the state machine engine 14 may include control and status registers 154. In addition, a restore buffer system (e.g., restore and program buffers 156) may be provided for configuring the SMEs 34, 36 of the FSM lattice 30 initially, or restoring the state of the SMEs 34, 36 in the FSM lattice 30 during analysis. For example, state vector data may be provided from the restore buffers 156 to the state vector intermediate input buffer 146 of the state vector system 141 (e.g., via the de-compressor 138). The de-compressor 138 may be used to decompress state vector data provided to the state vector memory buffer 144 and/or the state vector intermediate input buffer 146. The state vector system 141 may provide the state vector data to the FSM lattice 30 to configure SMEs 34, 36 of the FSM lattice 30. Similarly, a save buffer system (e.g., save and repair map buffers 158) may also be provided for storage of save and repair maps for setup and usage. For example, state vector data may be provided from the state vector intermediate output buffer 148 of the state vector system 141 to the save buffers 158 (e.g., via the compressor 140). The compressor 140 may be used to compress state vector data provided to the save buffers 158 from the state vector memory buffer 144 and/or the state vector intermediate output buffer 148.

Figure 10:
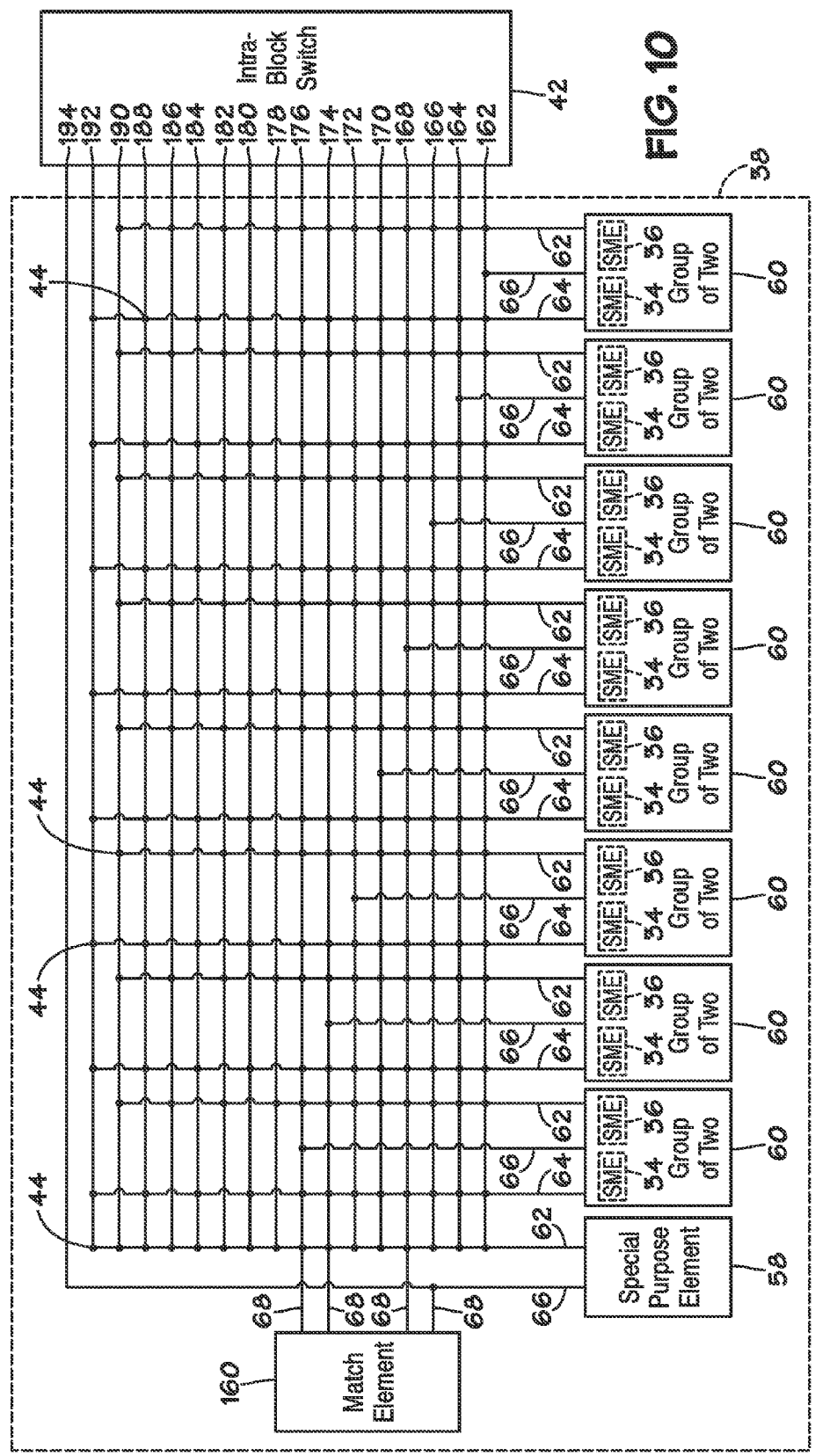
FIG. 10 illustrates an a second example of a row of the block of FIG. 3, according to various embodiments of the invention.

FIG. 10 illustrates a second example of a row 38 similar to that discussed above with respect to FIG. 4. The row 38 may include programmable intra-row switching elements 44 and row interconnection conductors 162, 164, 166, 168, 170, 172, 174, 176, 178, 180, 182, 184, 186, 188, 190, and 192 (which can also be referred to as "row routing lines 162-192," as described below and may be in addition to or used in place of interconnection conductors 68 and 70 of FIG. 4).

Row 38 of FIG. 10 may also include eight GOTs 60, a special purpose element 58, inputs 62, inputs 64, outputs 66, a match element 160, and a special purpose element routing line 194. The GOTs 60 and the special purpose element 58 illustrated in FIG. 10 can be substantially similar to the GOTs 60 and the special purpose element 58 previously discussed with respect to FIG. 4. Accordingly, each GOT 60 has inputs 62 and 64 for activation of SMEs 34, 36 therein to allow for an analysis to be performed by the respective SMEs 34, 36 of each GOT (e.g., a match in an analyzed data stream), which may be utilized in conjunction with results from other GOTs 60.

The result provided by a GOT 60 may be selectively provided from the GOT 60 on output 66. In one embodiment, the possible outputs of the GOT 60 may include no output, an output from SME 34 of the GOT 60, an output from SME 36 of the GOT 60, or a logical combination (e.g., OR) of the output of the first SME 34 and the output of the second SME 36. Thus, a GOT 60 may be configured to provide a selected result from the GOT 60. This configuration may be accomplished, for example, based on initial programming performed during an initial configuration of the FSM lattice 30. Results from the GOTs 60 may be provided to a match element 160, which may operate to provide a selected result from the row 38 for a given data stream analysis or a portion of a data stream analysis.

Additionally, row 38 may include row routing lines 162-192. In the present embodiment, there are sixteen row lines 162-192 that are selectively able to be coupled to eight GOTs 60 and to the special purpose element 58. However, it should be appreciated that fewer or more row routing lines may be utilized in conjunction with the row 38.

Each of the row routing lines 162-176 may be utilized to provide activation signals to any of the SMEs 34, 36 of GOTs 60 in row 38, while each of row routing lines 178, 182, 186 and 190 may be utilized to provide activation signals to any of the SMEs 34 of GOTs 60, and each of row routing lines 180, 184, 188 and 192 may be utilized to provide activation signals to any of the SMEs 36 of the GOTs 60. Accordingly, through use of these row routing lines 162-192, any particular detection cell 86 for any particular SME (e.g., SME 34) may be activated. This may be accomplished by selectively coupling (e.g., in accordance with a loaded image) the respective row routing line(s) 162-192 to the unified activation input 62, 64 of the particular SME 34, 36. For example, a GOT 60 may transmit an output 66 to the row routing line coupled thereto, for example, row routing line 162. It is then available to all the SMEs 34, 36, the Special Purpose Element 58, and (for row routing lines 166, 174, 176) the Match Element 160 on that same row 38. This output 66 signal may also be transmitted into the intra-block switch 42. The signal can then be output onto, for example, up to three block routing lines (e.g., three of lines 198-244 in FIG. 11). From there it may be routed to different rows 38 in the same block 32, through additional intra-block switches 42. It can also be routed to different blocks 32, through inter-blocks switches 40.

As illustrated in FIG. 10, each of the row routing lines 162-192 includes a plurality of intra-row switching elements 44 of FIG. 3, which may be utilized to selectively couple any GOT 60 to any other GOT 60, or any GOT 60 to any other element (e.g., a special purpose element 58) within the row 38 (or, for that matter, within another row and/or another block). However, these connections may be limited by available switching elements 196. For example, each of row routing lines 162, 164, 166, 168, 170, 172, 174, and 176, may be utilized to activate any of the SMEs 34, 36 in the row 38. However, each of row routing lines 162, 164, 166, 168, 170, 172, 174, and 176 also are selectively coupleable to the output of a respective different one of the GOTs 60. For example, an output from any one of the GOTs 60 may only be provided from that GOT 60 on a respective one of the row routing lines 162, 164, 166, 168, 170, 172, 174, and 176 coupleable thereto. Thus, in one embodiment, because row routing lines 162, 164, 166, 168, 170, 172, 174, and 176 are coupleable to the outputs 66 of the GOTs 60, the row routing lines 162, 164, 166, 168, 170, 172, 174, and 176 may provide (e.g., drive-out) signals to the intra-block switch 42. In contrast, in one embodiment, row routing lines 178, 180, 182, 184, 186, 188, 190, and 192 may receive (e.g. be driven by) signals from the intra-block switch 42 that may be received from, for example, other rows 38 or blocks 32.

In addition to row routing lines 162-192, the row 38 may include a special purpose element routing line 194 coupled to a special purpose element 58. Similar to row routing lines 162, 164, 166, 168, 170, 172, 174, and 176, the special purpose routing line 194 may provide (e.g., drive-out) signals to the intra-block switch 42 and, in one embodiment, the special purpose element routing line 194 may also be coupleable to the match element 160. For example, if the special purpose element 58 comprises a counter, an output of the counter may be provided to the special purpose routing line 194. Similarly, if the special purpose element 58 includes a Boolean logic element, such as a Boolean cell, an output of the Boolean logic element may be provided to the special purpose routing line 194. Through the use of these special purpose elements, repetitive searches (e.g., find an element ten times) or cascaded searches (e.g., find elements x, y, and z) may be simplified into a single output that can be provided by the special purpose routing line 194 to either or both of the intra-block switch 42 and the match element 160.

Figure 11:
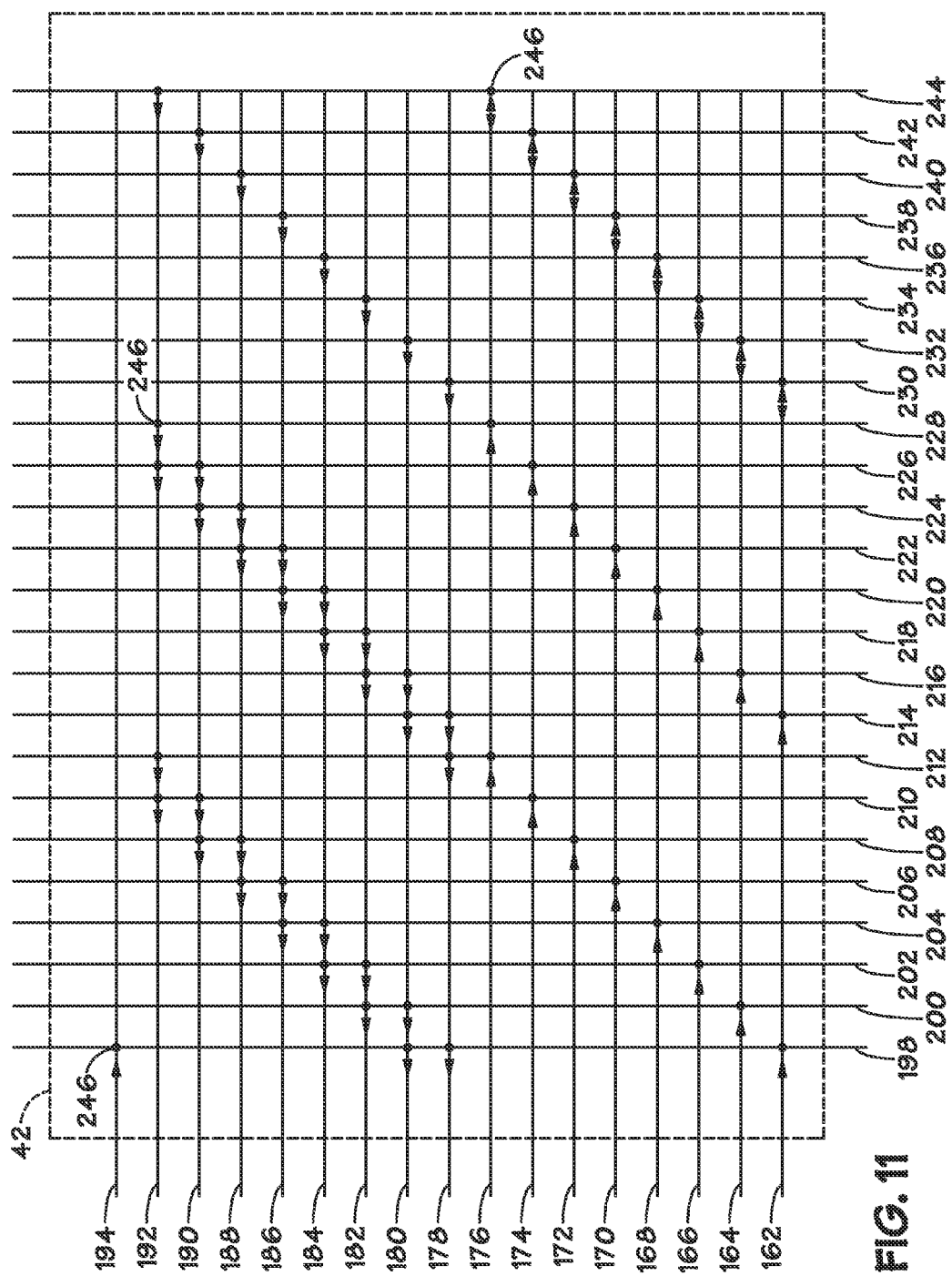
FIG. 11 illustrates the intra-block switch of FIG. 10, according to various embodiments of the invention.

A more detailed illustration of the intra-block switch 42 and its operation is presented in FIG. 11. As illustrated, the intra-block switch 42 may receive the row routing lines 162-192 as well as the special purpose element routing line 194, and these lines may intersect various block routing lines 198, 200, 202, 204, 206, 208, 210, 212, 214, 216, 218, 220, 222, 224, 226, 228, 230, 232, 234, 236, 238, 240, 242, and 244 (collectively referred to hereafter as "block routing lines 198-244") at a plurality of switching elements 246. These switching elements 246 may, for example, be utilized to selectively couple row routing lines 162-192 to block routing lines 198-244. In one embodiment, each of row routing lines 162, 164, 166, 168, 170, 172, 174, and 176 may provide (e.g., drive-out, send, transmit, transfer, pass, etc.) signals to the intra-block switch 42, while row routing lines 178, 180, 182, 184, 186, 188, 190, and 192 may receive (e.g., drive-in) signals from the intra-block switch 42. Accordingly, row routing lines 162, 164, 166, 168, 170, 172, 174, and 176 may be utilized to provide signals from the row 38 coupled to the intra-block switch 42 in FIG. 10 to adjacent rows 38, such as those illustrated in FIG. 3. Additionally or alternatively, row routing lines 162, 164, 166, 168, 170, 172, 174, and 176 may be utilized to provide signals from the row 38 coupled to the intra-block switch 42 in FIG. 10 to other rows 38 in the block 32 and/or to the block routing buffer 48 (not shown in FIG. 10 or 11). This may be accomplished by providing the signals from a given row 38 to one of the block routing lines 198-244 coupled thereto, since the block routing lines 198-244 are coupled to the various intra-block switches 42 and the block routing buffer 48 of FIG. 3. This may allow row 38 to provide any results generated therein to adjacent rows 38 or even other blocks 32. Furthermore, while row routing lines 162, 164, 166, 168, 170, 172, 174, and 176 may primarily be output lines (e.g., may primarily drive-out, send, transmit, transfer, pass, etc., signals to the intra-block switch 42), in some embodiments, row routing lines 162, 164, 166, 168, 170, 172, 174, and 176 may also receive signals from block routing lines 230, 232, 234, 236, 238, 240, 242, and 244, respectively.

Additionally, in one embodiment, each of the row routing lines 178, 180, 182, 184, 186, 188, 190, and 192 may receive (e.g., drive-in) signals from the intra-block switch 42. Accordingly, row routing lines 178, 180, 182, 184, 186, 188, 190, and 192 may be utilized to provide signals to the row 38 coupled to the intra-block switch 42 in FIG. 10 from adjacent rows 38, such as those illustrated in FIG. 3. Additionally or alternatively, row routing lines 178, 180, 182, 184, 186, 188, 190, and 192 may be utilized to provide signals from the row 38 coupled to the intra-block switch 42 in FIG. 10 from the block routing buffer 48. This may be accomplished by receiving signals generated in external blocks 32 or in adjacent rows 38 from one of the block routing lines 198-244 of FIG. 11, since the block routing lines 198-244 are coupled to the various intra-block switches 42 and the block routing buffer 48 of FIG. 3. This may allow row 38 to receive any results generated in adjacent rows 38 or even other blocks 32 from row routing lines 178, 180, 182, 184, 186, 188, 190, and 192 as well as from row routing lines 162, 164, 166, 168, 170, 172, 174, and 176 (e.g., when row routing lines 162, 164, 166, 168, 170, 172, 174, and 176 receive signals from block routing lines 230, 232, 234, 236, 238, 240, 242, and 244). In this manner, the intra-block switch 42 may couple row 38 with adjacent rows 38 and other blocks 32.

Thus, in some embodiments, the block routing lines 230, 232, 234, 236, 238, 240, 242, and 244 may be utilized to provide signals from a first block 32 to a second block 32, whereby the signals may be utilized as a signal to power up a second block 32 based on results provided in the first block 32. For example, when a first block 32 includes a row 38 that provides a result, this result may act as an indicator to another block 32 that it is time to power up to perform analysis. In this manner, some of the blocks 32 may be in a powered down state when not in use to conserve the overall power consumption of the FSM lattice 30, and, thus, the system 10. In this manner block routing lines 230, 232, 234, 236, 238, 240, 242, and 244 in a given block 32 may be utilized to allow for dynamic powering up of other blocks 32 in the FSM lattice 30.

Figure 12:
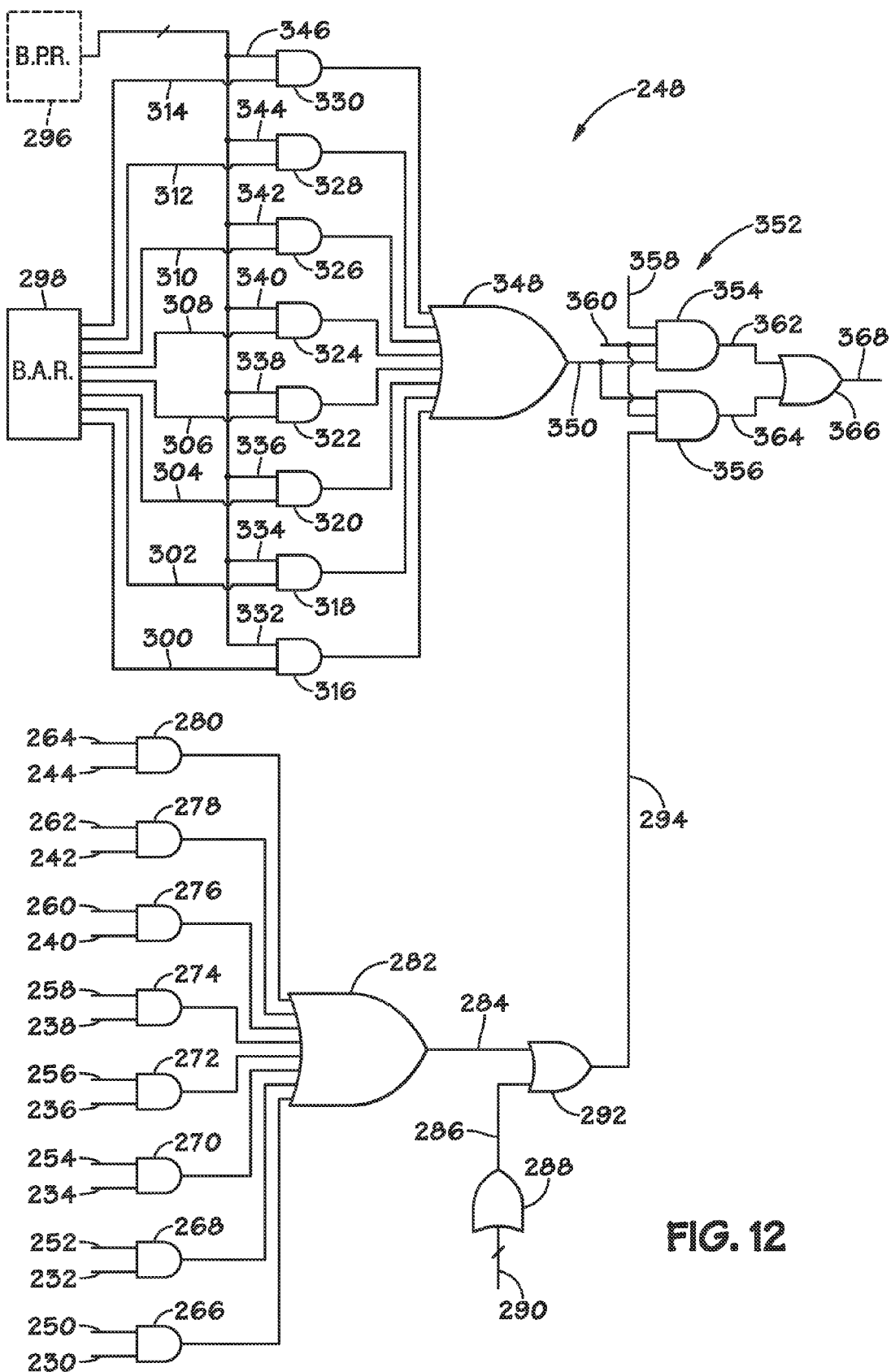
FIG. 12 illustrates block activation logic for a block of FIG. 2, according to various embodiments of the invention.

FIG. 12 illustrates a block diagram of block activation logic 248 for any of the blocks 32. Block activation logic 248 may operate to statically and/or dynamically activate (e.g., power-up) the block 32 to which it corresponds. It should be appreciated that this static and/or dynamic powering of the block may generally be referred to as adaptively powering-up and or powering-down the block 32. Dynamic powering-up of a block 32 may include receiving signals from block routing lines 230, 232, 234, 236, 238, 240, 242, and 244 from a currently powered block 32, as previously described with respect to FIG. 11. For example, block routing lines 230, 232, 234, 236, 238, 240, 242, and 244 may provide a result from (e.g., indicate that a match was found in) a currently powered block 32. In addition to receiving signals from block routing lines 230, 232, 234, 236, 238, 240, 242, and 244, the block activation logic 248 may also receive (e.g., in a dynamic power-up portion) block routing power select lines 250, 252, 254, 256, 258, 260, 262, and 264 (collectively referred to hereafter as "block routing power select lines 250-264"). These block routing power select lines 250-264 may be coupled to and receive signals from a configuration register initially programmed with values that to be transmitted along block power select lines 250-264. The signals provided by the block routing power select lines 250-264 may be determined by initial programming performed during an initial configuration of the FSM lattice 30, whereby the signals may control whether the block routing lines 230, 232, 234, 236, 238, 240, 242, and 244 will be utilized to dynamically power-up a given block 32. For example, block activation logic 248 can include a plurality of AND gates 266, 268, 270, 272, 274, 276, 278, and 280 (collectively referred to hereafter as "AND gates 266-280") that utilize the block routing power select lines 250-264 and the block routing lines 230, 232, 234, 236, 238, 240, 242, and 244 as input lines. Thus, the block routing power select lines 250-264 may operate as control signals, since even if a block routing line 230, 232, 234, 236, 238, 240, 242, or 244 provides an active signal (e.g., a "1"), such as an indication of a match at a currently powered block 32, without the corresponding block routing power select line 250-264 also providing an active signal (e.g., a "1"), no active (e.g., a "1") signal will be provided by (e.g., issue from) the respective one of the AND gates 266-280.

The results provided by each of the AND gates 266-280 may be provided to the OR gate 282. Thus, if any of the block routing lines 230, 232, 234, 236, 238, 240, 242, and 244 as well as its corresponding block routing power select line 250-264 have provided a positive result (i.e., a "1"), then the 8-input OR gate 282 will provide an active signal (e.g., a "1") as a power-up block signal on line 284. This power-up block signal, since it incorporates results from a currently powered block, may constitute a dynamic activation signal.

A second dynamic activation signal may be provided in the block activation logic 248. This second dynamic signal may be a row active indication signal on line 286 provided by an AND gate 288. The AND gate 288 may be, for example, a 256 input AND gate. For example, the AND gate 288 may be a block active sensing element that receives an indication on lines 290 from each of the (e.g., 256) SMEs of the block 32 corresponding to the block activation logic 248. In some embodiments, this indication from the SMEs of block 32 may be received at lines from, for example, row routing lines 162-192 or directly from the SMEs 34, 36 of the block 32 along a secondary path separate from the row routing lines. The AND gate 288 may allow for determining whether any of the SMEs 34, 36 in the block 32 corresponding to the block activation logic 248 are actively analyzing (e.g., sensing). In this manner, the AND gate 288 operates to provide a row state vector for the block 32 (as an active indication signal on line 286). The dynamic signals on lines 284 and 286 may be provided to an OR gate 292, which may provide an active signal (e.g., "1") if either of the dynamic signals are active (i.e., "1") on line 294.

The block activation logic 248 may further include a static power-up portion. This static power-up portion may receive signals from, for example, a global power partitioning register (BPR) 296 and may include a block power partition assignment register (BAR) 298. Each of the BPR 296 and the BAR 298 may be registers such that the BPR 296 may be part of the programming interface 56 while a BAR 298 is present in each block 32. In one embodiment, the BPR 296 may provide, for example, an 8-bit code that is provided to each of the blocks 32. This code (which may be a distinct code for each block 32) may direct each of the blocks 32 of the FSM lattice 30 as to which blocks 32 are to be active (e.g., when the block 32 will be active), for example, at the start of a stream of data to be analyzed. Alternatively, a single code that instructs all blocks 32 (e.g., each block 32 may read the portion of the code related to itself) may be provided. For example, the code may indicate whether a new flow of data is to be searched and may transmit activation signals to relevant blocks 32 to allow for powering up of those blocks 32 (e.g., signal whether a particular block 32 will be involved in a particular analysis of data so that the blocks 32 may be powered-up or remain in an off state). In this manner, the BPR 296 may, for example, provide a global activation signals to any blocks to be involved in a particular search.

The BAR 298 may be a register that is initially configured (e.g., set-up) based on an initial set of instructions from, for example, the programming interface 56, based on particular searches to be performed (e.g., a data stream to be searched).

This may be performed, for example, at an initial power up of the system 10. The BAR 298 may be initially configured to provide activation values in conjunction with a particular search. For example, the BAR 298 can be initially configured to provide signals on lines 300, 302, 304, 306, 308, 310, 312, and 314 that correspond to whatever assignment is preset by the programming interface 56. These signals may be received as respective inputs at AND gates 316, 318, 320, 322, 324, 326, 328, and 330 (collectively referred to hereafter as "AND gates 316-330"). The BAR 298 may provide signals based on the whether the block 32 is to be used at a certain time (e.g., based on the current data being processed). For example, the BAR 298 may be utilized when a data stream to be searched is first searched in a given block 32. Thus, the BAR may power-on the block 32 when the data stream search begins in that block 32.

A second input at AND gates 316-330 may be signals corresponding to the information (e.g., a code) received by the BPR 296. For example, during operation of the FSM lattice 30, the BPR 296 may receive information from the programming interface 56 that indicates what analysis (e.g., search) is to be performed. The BPR 296 may provide signals corresponding to this received information to lines 332, 334, 336, 338, 340, 342, 344, and 346, such that the signals provided on lines 332, 334, 336, 338, 340, 342, 344, and 346 correspond to whatever analysis is being performed. If the preset values of the BAR 298 match the values of the BPR 296 (i.e., if a "1" value is received at both inputs of one or more of the AND gates 316-330), then an active signal (i.e., a "1") will be provided by any of the AND gates 316-330 that received an active signal at both of its inputs. Accordingly, the AND gates 316-330 operate to, for example, provide activation signals when a search that is being undertaken will utilize a given block 32 (e.g., determine when a search to be undertaken matches the search that block 32 is programmed to undertake).

Moreover, each of the AND gates 316-330 may be coupled to an OR gate 348. Thus, if any of the AND gates 316-330 are activated (e.g., provide a "1"), then the 8-input OR gate 348 will provide an active power partition activation signal on line 350. This power partition activation signal, since it incorporates results from an initial set-up of the block activation logic 248, may constitute a static activation signal.

Each of the lines 294 and 350 may be coupled to a power selection circuit 352, such as one that includes two AND gates 354 and 356. In one embodiment, the AND gate 354 may be a three input AND gate that is coupled to lines 350, 358 and 360. Line 358 of the power selection circuit 352 may provide a start SME signal. For example, if a search is to begin in a particular block 32, the BAR 298 may be set to power on the respective block 32 in conjunction with the global settings from the BPR 296. Additionally, if the first bit of data is to be analyzed by a particular block 32 (e.g., if that block is the first to analyze data), then the value along line 358 may reflect this condition as a start SME signal. Line 360 allows for a disabling of the block 32 completely, regardless of a flow being searched. IN this manner, line 360 operates as a global override. Typically line 360 would provide a high signal (e.g., 1), however, when no programming in block 32 is ever going to be used for a particular application, line 360 may provide a block off signal (e.g., 0). This allows for block specific activation of block 32 based on a current search being performed or an upcoming search to be performed. In one embodiment, the start SME signal and the block on/off signals may be received from the programming interface 56 and may operate as a power partition activation signals that may be active (e.g., set to "1") if, for example, the block 32 is needed at the start of a processing cycle. For example, the start SME signal and the block on/off signals from lines 358 and 360 allow the programming interface 56 to directly access the block activation logic 248 when it is determined that a given block 32 is to be utilized during analysis.

In one embodiment, the power selection circuit 352 may integrate the static and dynamic portions of the block activation logic 248. For example, AND gate 356 of the power selection circuit 352 may be a three input AND gate coupled to line 294 (e.g., providing a dynamic signal), as well as lines 350 and 360 (e.g., providing static inputs). This may allow for overall control of the powering of each block 32 by the programming interface 56, regardless of the signals received from a currently powered block 32. Depending on the signals received at the AND gates 354 and 356, output signals may be provided on lines 362 and 364. Thus, if each of the inputs to AND gate 354 are active (e.g., a "1"), then the output value (e.g., a force block activation signal) on line 362 will be active (e.g., a "1"). Similarly, if each of the inputs to AND gate 356 are active (e.g., a "1"), then the output value (e.g., a conditional block activation signal) on line 364 will be active (e.g., a "1"). Finally, the block activation logic 248 may include an OR gate 366 that is coupled to lines 362 and 364. Thus, if either of the AND gates 354 or 356 are active (e.g., a "1"), then OR gate 366 will provide an active signal (e.g., a "1") as a block activation signal on line 368 to power on the block 32 corresponding to the block activation logic 248. For example, this activation signal on line 368 may operate in a manner similar to powering dynamic read only memory (DRAM) by allowing for the disabling of row decoders (when the activation signal is low), for example, of blocks 32 so that no rows are ever selected. By not driving power to select rows and not discharging bit lines of the blocks 32 (again, similar to the operation of (DRAM), power is conserved in a manner similar to a standby or sleep mode. Accordingly, through utilization of the block activation logic 248, blocks 32 may be left in an off state until they are required for data analysis, allowing the overall power consumption of the FSM lattice 30 to be drastically reduced to, for example, less than 40, 30, 25, or 20 watts, while still allowing for full data analysis.

Figure 13:
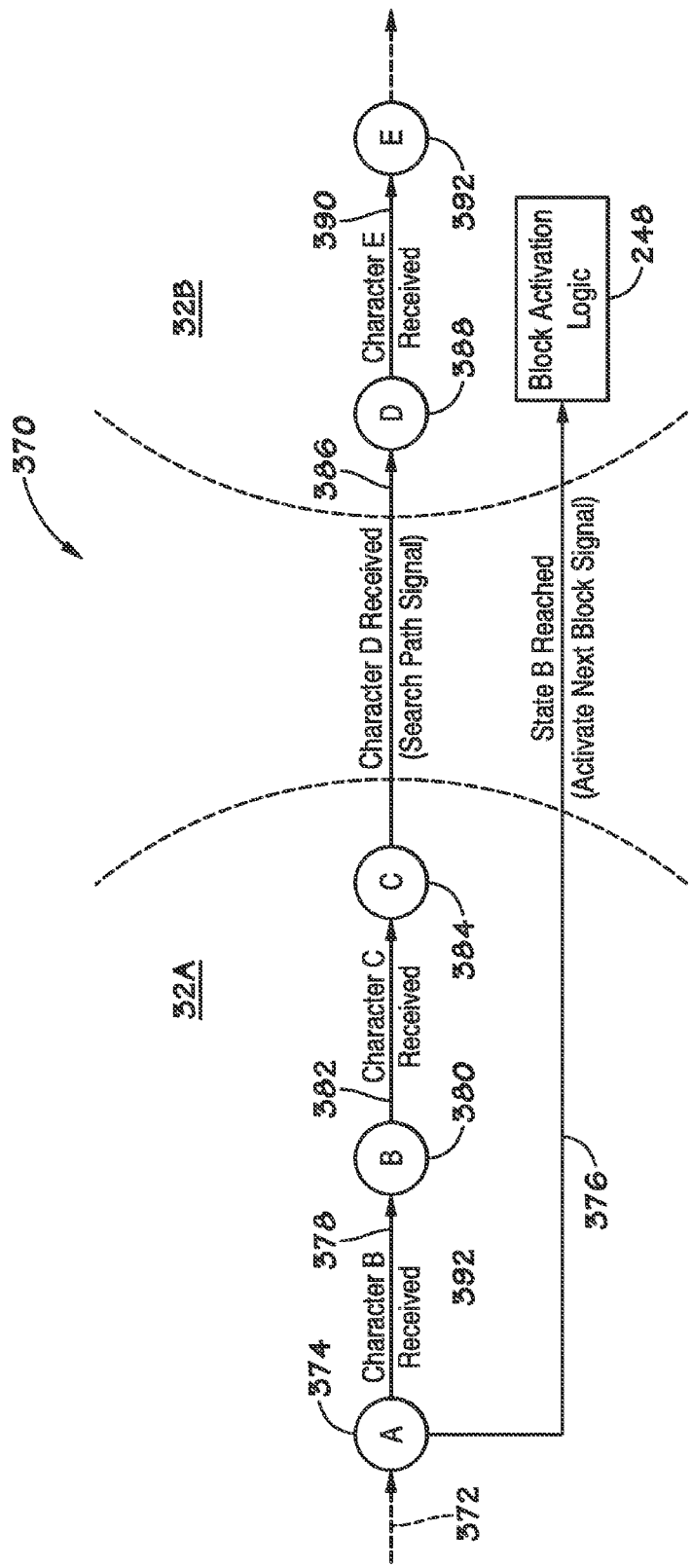
FIG. 13 is a state diagram illustrating an operation of the block activation logic of FIG. 12, according to various embodiments of the invention.

FIG. 13 illustrates an example of the operation of the block activation logic 248. State diagram 370 shows the interaction of a currently powered block 32 as well as a block 32 to be powered-up to search for a character string of "ABCDE". At point 372, a first character, "A" is searched for in the currently powered block 32. When this character, "A", is found at point 374, the currently powered block 32 begins a search for a second character, "B". At this time, the currently powered block 32 also will provide results to the block 32 to be powered-up, as illustrated in path 376. For example, while the block 32 to be powered-up is not needed to search for a term until character "D", it may take time to initialize the block 32 to be powered-up. Thus, an indication that the character "A" has been found may trigger notification for the block 32 to be powered-up, so that it may seamlessly be able to search for the character "D". Accordingly, while the currently powered block 32 searches for character "B" at point 378, finds character "B" at point 380, searches for character "C" at point 382, and finds character "C" at point 384, the block 32 to be powered-up may be powered up by the block activation logic 248. Thus, when an indication that the character "C" is received by the block 32 to be powered-up, the block 32 to be powered-up will be ready to search for the character "D" at point 386, find character "D" at point 388, search for character "E" at point 390, and find character "E" at point 392. In this manner, multiple blocks 32 may be utilized to perform a single search without each block being active (e.g., powered-up) during the entirety of the search.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device, comprising:
blocks, each of the blocks comprising rows, each of the rows comprising programmable elements, each of the programmable elements configured to analyze at least a portion of data to be analyzed and to selectively provide a result of the analysis; and
block activation logic corresponding to a block of the blocks, wherein the block activation logic is configured to dynamically power-up the block, wherein the block activation logic comprises a register configured to provide a first signal based at least in part on an indication of whether the portion of data to be analyzed is to be initially analyzed in the block.

2. The device of claim 1, wherein the block activation logic is configured to receive an indication of whether any of the programmable elements of the block are active.

3. The device of claim 2, wherein the block activation logic is configured to dynamically power-up the block based at least in part on the indication of whether any of the programmable elements are active.

4. A device, comprising:
blocks, each of the blocks comprising rows, each of the rows comprising programmable elements, each of the programmable elements configured to analyze at least a portion of data to be analyzed and to selectively provide a result of the analysis; and
block activation logic corresponding to a block of the blocks, wherein the block activation logic is configured to dynamically power-up the block, wherein the block activation logic is configured to receive an indication of a result of an analysis from another one of the blocks, wherein the block activation logic is configured to dynamically power-up the block based at least in part on the indication of the result of the analysis from the other one of the blocks.

5. The device of claim 1, wherein the block activation logic is configured to receive a second signal related to whether the block will be involved in analysis of the portion of data to be analyzed.

6. The device of claim 5, wherein the block activation logic comprises an AND gate configured to receive the first signal and the second signal and provide an output based at least in part on the first signal and the second signal.

7. The device of claim 6, wherein the block activation logic is configured to adaptively power-up the block based at least in part on the output.

8. A device, comprising:
blocks, each of the blocks comprising rows, each of the rows comprising programmable elements, each of the programmable elements configured to analyze at least a portion of data to be analyzed and to selectively provide a result of the analysis; and
block activation logic configured to dynamically power-up the block, wherein the block activation logic comprises an AND gate configured to:
receive a first indication of whether any of the programmable elements of the block are active or whether a result of an analysis from another block of has been received,
receive a second indication of whether of the data stream to be analyzed will be analyzed by the block; and
provide a block activation signal based at least in part on the first indication and the second indication.

9. The device of claim 8, wherein the block activation logic is configured to adaptively power-up the block based at least in part on the block activation signal.

10. A method, comprising:
receiving a first indication relating to whether a block is to be involved in an analysis of at least a portion of data;
providing from a second register a second indication of whether the portion of data to be analyzed is to be initially analyzed in the block; and
providing a first activation signal for the block based at least in part on a comparison of the first and second indications.

11. The method of claim 10, comprising receiving a third indication of whether any of the programmable elements of the block are active.

12. The method of claim 11, comprising receiving a fourth indication of a result of an analysis of at least a portion of the data to be analyzed from a second block.

13. The method of claim 12, comprising providing a second activation signal based at least in part on a comparison of the third and fourth indications.

14. The method of claim 13, comprising providing a block activation signal configured to allow the block to be powered, wherein the block activation signal is based at least in part on a comparison of the first activation signal and the second activation signal.

15. A device, comprising:
a first block of programmable elements, wherein at least one of the programmable elements is configured to analyze at least a portion of data to be analyzed and to provide a result of the analysis;
a second block of programmable elements; and
a block switch configured to selectively route the result provided by the first block as a signal to power up the second block.

16. The device of claim 15, further comprising block activation logic configured to receive the result from the first block.

17. The device of claim 16, wherein the block activation logic is configured to adaptively power-up the second block based at least in part on the result.

18. A method, comprising:
analyzing data with at least a portion of a first block of programmable elements;
providing, to a second block of programmable elements, an activation signal based at least in part on a result of analyzing the data with the at least a portion of a first block of programmable elements;
activating the second block of programmable elements based on the activation signal; and
analyzing the data with at least a portion of the second block of programmable elements.

19. The method of claim 18, wherein the activation signal includes an indication to power-up the second logic block.

* * * * *